US010319252B2

(12) United States Patent
Galley et al.

(10) Patent No.: US 10,319,252 B2
(45) Date of Patent: Jun. 11, 2019

(54) LANGUAGE CAPABILITY ASSESSMENT AND TRAINING APPARATUS AND TECHNIQUES

(75) Inventors: Michel Galley, New York, NY (US); Kevin Knight, Marina del Rey, CA (US); Daniel Marcu, Hermosa Beach, CA (US)

(73) Assignee: SDL Inc., Wakefield, MA (US)

( * ) Notice: Subject to any disclaimer, the term of this patent is extended or adjusted under 35 U.S.C. 154(b) by 0 days.

(21) Appl. No.: 11/272,460

(22) Filed: Nov. 9, 2005

(65) Prior Publication Data

US 2007/0122792 A1 May 31, 2007

(51) Int. Cl.
*G09B 7/00* (2006.01)
*G09B 7/02* (2006.01)
*G09B 5/00* (2006.01)

(52) U.S. Cl.
CPC ............... *G09B 7/02* (2013.01); *G09B 5/00* (2013.01); *G09B 7/00* (2013.01)

(58) Field of Classification Search
CPC ....................................................... G09B 7/00
USPC ....... 434/118, 247, 322, 323, 350, 353, 362; 704/1–10; 3/118, 247, 322, 323, 350, 3/353, 362
See application file for complete search history.

(56) References Cited

U.S. PATENT DOCUMENTS

| | | | |
|---|---|---|---|
| 4,055,907 A * | 11/1977 | Henson | G09B 7/02 434/308 |
| 4,502,128 A | 2/1985 | Okajima et al. | |
| 4,509,137 A * | 4/1985 | Yoshida | G06F 17/289 434/157 |
| 4,599,691 A | 7/1986 | Sakaki et al. | |
| 4,615,002 A | 9/1986 | Innes | |
| 4,661,924 A | 4/1987 | Okamoto et al. | |
| 4,787,038 A | 11/1988 | Doi et al. | |
| 4,791,587 A * | 12/1988 | Doi | 704/2 |
| 4,800,522 A | 1/1989 | Miyao et al. | |
| 4,814,987 A | 3/1989 | Miyao et al. | |
| 4,845,658 A | 7/1989 | Gifford | |
| 4,916,614 A | 4/1990 | Kaji | |

(Continued)

FOREIGN PATENT DOCUMENTS

| | | |
|---|---|---|
| AU | 5240198 A | 5/1998 |
| AU | 694367 B2 | 7/1998 |

(Continued)

OTHER PUBLICATIONS

Abney, Stephen, "Parsing by Chunks," 1991, Principle-Based Parsing: Computation and Psycholinguistics, vol. 44, pp. 257-279.

(Continued)

*Primary Examiner* — Robert J Utama
(74) *Attorney, Agent, or Firm* — Carr & Ferrell LLP

(57) ABSTRACT

A learning system for a text-to-text application such as a machine translation system. The system has questions, and a matrix of correct answers to those questions. Any of the many different correct answers within the matrix can be considered as perfectly correct answers to the question. The system operates by displaying a question, which may be a phrase to be translated, and obtaining an answer to the question from the user. The answer is compared against the matrix and scored. Feedback may also be provided to the user.

30 Claims, 4 Drawing Sheets

(56) References Cited

U.S. PATENT DOCUMENTS

| | | | |
|---|---|---|---|
| 4,920,499 A | 4/1990 | Skeirik | |
| 4,942,526 A | 7/1990 | Okajima et al. | |
| 4,980,829 A | 12/1990 | Okajima et al. | |
| 5,088,038 A * | 2/1992 | Tanaka et al. | 704/2 |
| 5,091,876 A * | 2/1992 | Kumano et al. | 704/3 |
| 5,146,405 A | 9/1992 | Church | |
| 5,167,504 A | 12/1992 | Mann | |
| 5,175,684 A | 12/1992 | Chong | |
| 5,181,163 A | 1/1993 | Nakajima et al. | |
| 5,212,730 A | 5/1993 | Wheatley et al. | |
| 5,218,537 A * | 6/1993 | Hemphill et al. | 704/1 |
| 5,220,503 A | 6/1993 | Suzuki et al. | |
| 5,267,156 A | 11/1993 | Nomiyama | |
| 5,268,839 A | 12/1993 | Kaji | |
| 5,275,569 A * | 1/1994 | Watkins | G09B 19/06 434/156 |
| 5,295,068 A | 3/1994 | Nishino et al. | |
| 5,302,132 A * | 4/1994 | Corder | 434/156 |
| 5,311,429 A | 5/1994 | Tominaga | |
| 5,351,189 A | 9/1994 | Doi | |
| 5,387,104 A * | 2/1995 | Corder | 704/270 |
| 5,408,410 A | 4/1995 | Kaji | |
| 5,418,717 A | 5/1995 | Su et al. | |
| 5,432,948 A | 7/1995 | Davis et al. | |
| 5,442,546 A * | 8/1995 | Kaji et al. | 704/4 |
| 5,458,425 A | 10/1995 | Torok | |
| 5,477,450 A | 12/1995 | Takeda et al. | |
| 5,477,451 A | 12/1995 | Brown et al. | |
| 5,488,725 A | 1/1996 | Turtle et al. | |
| 5,495,413 A | 2/1996 | Kutsumi et al. | |
| 5,497,319 A | 3/1996 | Chong et al. | |
| 5,510,981 A | 4/1996 | Berger et al. | |
| 5,528,491 A | 6/1996 | Kuno et al. | |
| 5,535,120 A | 7/1996 | Chong et al. | |
| 5,541,836 A * | 7/1996 | Church et al. | 704/7 |
| 5,541,837 A | 7/1996 | Fushimoto | |
| 5,548,508 A | 8/1996 | Nagami | |
| 5,587,902 A | 12/1996 | Kugimiya | |
| 5,640,575 A | 6/1997 | Maruyama | |
| 5,644,774 A | 7/1997 | Fukumochi et al. | |
| 5,675,815 A * | 10/1997 | Yamauchi et al. | 715/236 |
| 5,687,383 A | 11/1997 | Nakayama et al. | |
| 5,696,980 A | 12/1997 | Brew | |
| 5,708,780 A | 1/1998 | Levergood et al. | |
| 5,715,314 A | 2/1998 | Payne et al. | |
| 5,724,424 A | 3/1998 | Gifford | |
| 5,724,593 A | 3/1998 | Hargrave, III et al. | |
| 5,752,052 A | 5/1998 | Richardson et al. | |
| 5,754,972 A | 5/1998 | Baker et al. | |
| 5,761,631 A | 6/1998 | Nasukawa | |
| 5,761,689 A | 6/1998 | Rayson et al. | |
| 5,768,603 A * | 6/1998 | Brown et al. | 704/9 |
| 5,779,486 A * | 7/1998 | Ho et al. | 434/353 |
| 5,781,884 A | 7/1998 | Pereira et al. | |
| 5,794,178 A | 8/1998 | Caid et al. | |
| 5,805,832 A | 9/1998 | Brown et al. | |
| 5,806,032 A | 9/1998 | Sproat | |
| 5,812,776 A | 9/1998 | Gifford | |
| 5,819,265 A | 10/1998 | Ravin et al. | |
| 5,826,219 A | 10/1998 | Kutsumi | |
| 5,826,220 A * | 10/1998 | Takeda et al. | 704/7 |
| 5,845,143 A * | 12/1998 | Yamauchi et al. | 704/2 |
| 5,848,385 A | 12/1998 | Poznanski et al. | |
| 5,848,386 A | 12/1998 | Motoyama | |
| 5,850,561 A | 12/1998 | Church et al. | |
| 5,855,015 A | 12/1998 | Shoham | |
| 5,864,788 A | 1/1999 | Kutsumi | |
| 5,867,811 A | 2/1999 | O'Donoghue | |
| 5,870,706 A | 2/1999 | Alshawi | |
| 5,873,056 A | 2/1999 | Liddy | |
| 5,893,134 A | 4/1999 | O'Donoghue et al. | |
| 5,903,858 A | 5/1999 | Saraki | |
| 5,907,821 A | 5/1999 | Kaji et al. | |
| 5,909,492 A | 6/1999 | Payne et al. | |
| 5,909,681 A | 6/1999 | Passera et al. | |
| 5,930,746 A | 7/1999 | Ting | |
| 5,960,384 A | 9/1999 | Brash | |
| 5,963,205 A | 10/1999 | Sotomayor | |
| 5,966,685 A | 10/1999 | Flanagan et al. | |
| 5,966,686 A | 10/1999 | Heidorn et al. | |
| 5,974,372 A | 10/1999 | Barnes | |
| 5,983,169 A | 11/1999 | Kozma | |
| 5,987,402 A | 11/1999 | Murata et al. | |
| 5,987,404 A | 11/1999 | Della Pietra et al. | |
| 5,991,710 A | 11/1999 | Papineni et al. | |
| 5,995,922 A | 11/1999 | Penteroudakis et al. | |
| 6,018,617 A * | 1/2000 | Sweitzer et al. | 358/1.15 |
| 6,031,984 A | 2/2000 | Walser | |
| 6,032,111 A | 2/2000 | Mohri | |
| 6,044,344 A | 3/2000 | Kanevsky | |
| 6,047,252 A | 4/2000 | Kumano et al. | |
| 6,049,785 A | 4/2000 | Gifford | |
| 6,064,819 A | 5/2000 | Franssen et al. | |
| 6,064,951 A | 5/2000 | Park et al. | |
| 6,073,143 A | 6/2000 | Nishikawa et al. | |
| 6,077,085 A * | 6/2000 | Parry et al. | 434/322 |
| 6,085,162 A | 7/2000 | Cherny | |
| 6,092,034 A | 7/2000 | McCarley et al. | |
| 6,119,077 A | 9/2000 | Shinozaki | |
| 6,119,078 A | 9/2000 | Kobayakawa et al. | |
| 6,131,082 A | 10/2000 | Hargrave, III et al. | |
| 6,161,082 A | 12/2000 | Goldberg et al. | |
| 6,182,014 B1 | 1/2001 | Kenyon et al. | |
| 6,182,026 B1 * | 1/2001 | Tillmann | G06F 17/2809 704/2 |
| 6,182,027 B1 | 1/2001 | Nasukawa et al. | |
| 6,185,524 B1 | 2/2001 | Carus et al. | |
| 6,195,649 B1 | 2/2001 | Gifford | |
| 6,199,051 B1 | 3/2001 | Gifford | |
| 6,205,437 B1 | 3/2001 | Gifford | |
| 6,205,456 B1 | 3/2001 | Nakao | |
| 6,206,700 B1 * | 3/2001 | Brown et al. | 434/116 |
| 6,212,634 B1 | 4/2001 | Geer et al. | |
| 6,223,150 B1 | 4/2001 | Duan et al. | |
| 6,233,544 B1 | 5/2001 | Alshawi | |
| 6,233,545 B1 * | 5/2001 | Datig | 704/2 |
| 6,233,546 B1 | 5/2001 | Datig | |
| 6,236,958 B1 | 5/2001 | Lange et al. | |
| 6,269,351 B1 | 7/2001 | Black | |
| 6,275,789 B1 * | 8/2001 | Moser et al. | 704/7 |
| 6,278,967 B1 | 8/2001 | Akers et al. | |
| 6,278,969 B1 | 8/2001 | King et al. | |
| 6,279,112 B1 | 8/2001 | O'toole, Jr. et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,317,708 B1 | 11/2001 | Witbrock et al. | |
| 6,327,568 B1 | 12/2001 | Joost | |
| 6,330,529 B1 * | 12/2001 | Ito | 704/3 |
| 6,330,530 B1 | 12/2001 | Horiguchi et al. | |
| 6,356,864 B1 * | 3/2002 | Foltz et al. | 704/1 |
| 6,356,865 B1 | 3/2002 | Franz et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,415,257 B1 | 7/2002 | Junqua | |
| 6,449,599 B1 | 9/2002 | Payne et al. | |
| 6,460,015 B1 | 10/2002 | Hetherington et al. | |
| 6,470,306 B1 | 10/2002 | Pringle et al. | |
| 6,473,729 B1 | 10/2002 | Gastaldo et al. | |
| 6,473,896 B1 * | 10/2002 | Hicken et al. | 717/132 |
| 6,477,524 B1 | 11/2002 | Taskiran | |
| 6,480,698 B2 * | 11/2002 | Ho et al. | 434/362 |
| 6,490,358 B1 | 12/2002 | Geer et al. | |
| 6,490,549 B1 | 12/2002 | Ulicny et al. | |
| 6,490,563 B2 | 12/2002 | Hon | |
| 6,498,921 B1 * | 12/2002 | Ho et al. | 434/362 |
| 6,502,064 B1 | 12/2002 | Miyahira et al. | |
| 6,529,865 B1 | 3/2003 | Duan et al. | |
| 6,535,842 B1 * | 3/2003 | Roche et al. | 704/7 |
| 6,587,844 B1 | 7/2003 | Mohri | |

(56) References Cited

U.S. PATENT DOCUMENTS

| | | |
|---|---|---|
| 6,598,046 B1 | 7/2003 | Goldberg et al. |
| 6,604,101 B1 | 8/2003 | Chan et al. |
| 6,609,087 B1 | 8/2003 | Miller et al. |
| 6,647,364 B1 | 11/2003 | Yumura et al. |
| 6,658,627 B1 | 12/2003 | Gallup |
| 6,691,279 B2 | 2/2004 | Yoden et al. |
| 6,704,741 B1* | 3/2004 | Lively, Jr. ............... G09B 7/02 |
| 6,745,161 B1 | 6/2004 | Arnold et al. |
| 6,745,176 B2 | 6/2004 | Probert, Jr. et al. |
| 6,757,646 B2 | 6/2004 | Marchisio |
| 6,778,949 B2* | 8/2004 | Duan et al. ..................... 704/2 |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,865,528 B1 | 3/2005 | Huang |
| 6,885,985 B2* | 4/2005 | Hull ............................... 704/2 |
| 6,901,361 B1 | 5/2005 | Portilla |
| 6,904,402 B1 | 6/2005 | Wang et al. |
| 6,910,003 B1 | 6/2005 | Arnold et al. |
| 6,920,419 B2 | 7/2005 | Kitamura |
| 6,952,665 B1* | 10/2005 | Shimomura et al. ............ 704/2 |
| 6,976,207 B1 | 12/2005 | Rujan |
| 6,983,239 B1 | 1/2006 | Epstein |
| 6,990,439 B2 | 1/2006 | Xun |
| 6,993,473 B2 | 1/2006 | Cartus |
| 6,996,518 B2* | 2/2006 | Jones et al. ..................... 704/8 |
| 6,996,520 B2* | 2/2006 | Levin .............................. 704/10 |
| 6,999,925 B2 | 2/2006 | Fischer et al. |
| 7,013,262 B2 | 3/2006 | Tokuda et al. |
| 7,013,264 B2 | 3/2006 | Dolan |
| 7,016,827 B1* | 3/2006 | Ramaswamy et al. ........... 704/9 |
| 7,016,977 B1 | 3/2006 | Dunsmoir et al. |
| 7,024,351 B2 | 4/2006 | Wang |
| 7,031,908 B1 | 4/2006 | Huang |
| 7,031,911 B2 | 4/2006 | Zhou et al. |
| 7,050,964 B2 | 5/2006 | Menezes et al. |
| 7,054,803 B2 | 5/2006 | Eisele |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,124,092 B2 | 10/2006 | O'toole, Jr. et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,191,447 B1 | 3/2007 | Ellis et al. |
| 7,194,403 B2 | 3/2007 | Okura et al. |
| 7,197,451 B1 | 3/2007 | Carter et al. |
| 7,200,550 B2 | 4/2007 | Menezes et al. |
| 7,206,736 B2 | 4/2007 | Moore |
| 7,207,005 B2 | 4/2007 | Laktritz |
| 7,209,875 B2* | 4/2007 | Quirk et al. ..................... 704/2 |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,272,639 B1 | 9/2007 | Levergood et al. |
| 7,283,950 B2 | 10/2007 | Pournasseh et al. |
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,328,156 B2 | 2/2008 | Meliksetian et al. |
| 7,333,927 B2 | 2/2008 | Lee |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,353,165 B2 | 4/2008 | Zhou |
| 7,356,457 B2 | 4/2008 | Pinkham et al. |
| 7,369,984 B2 | 5/2008 | Fairweather |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,223 B2 | 6/2008 | Atkin |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,448,040 B2 | 11/2008 | Ellis et al. |
| 7,454,326 B2 | 11/2008 | Marcu et al. |
| 7,496,497 B2 | 2/2009 | Liu |
| 7,509,313 B2 | 3/2009 | Colledge |
| 7,516,062 B2 | 4/2009 | Chen et al. |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,584,092 B2 | 9/2009 | Brockett et al. |
| 7,587,307 B2 | 9/2009 | Cancedda et al. |
| 7,620,538 B2 | 11/2009 | Marcu et al. |
| 7,620,549 B2 | 11/2009 | Di Cristo et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,636,656 B1 | 12/2009 | Nieh |
| 7,668,782 B1 | 2/2010 | Reistad et al. |
| 7,680,646 B2 | 3/2010 | Lux-Pogodalla et al. |
| 7,680,647 B2 | 3/2010 | Moore |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,865,358 B2 | 1/2011 | Green |
| 7,925,493 B2 | 4/2011 | Watanabe |
| 7,925,494 B2* | 4/2011 | Cheng et al. ..................... 704/3 |
| 7,945,437 B2 | 5/2011 | Mount et al. |
| 7,957,953 B2 | 6/2011 | Moore |
| 7,974,833 B2 | 7/2011 | Soricut et al. |
| 7,974,976 B2 | 7/2011 | Yahia et al. |
| 7,983,896 B2 | 7/2011 | Ross et al. |
| 7,983,897 B2 | 7/2011 | Chin et al. |
| 8,060,360 B2* | 11/2011 | He ..................................... 704/9 |
| 8,078,450 B2 | 12/2011 | Anisimovich |
| 8,135,575 B1 | 3/2012 | Dean |
| 8,145,472 B2* | 3/2012 | Shore et al. ..................... 704/2 |
| 8,195,447 B2 | 6/2012 | Anismovich |
| 8,214,196 B2 | 7/2012 | Yamada et al. |
| 8,219,382 B2 | 7/2012 | Kim et al. |
| 8,234,106 B2 | 7/2012 | Marcu et al. |
| 8,239,186 B2 | 8/2012 | Chin |
| 8,239,207 B2 | 8/2012 | Seligman et al. |
| 8,244,519 B2 | 8/2012 | Bicici et al. |
| 8,249,854 B2 | 8/2012 | Nikitin et al. |
| 8,265,923 B2 | 9/2012 | Chatterjee et al. |
| 8,275,600 B2 | 9/2012 | Bilac et al. |
| 8,286,185 B2 | 10/2012 | Ellis et al. |
| 8,296,127 B2 | 10/2012 | Marcu et al. |
| 8,315,850 B2 | 11/2012 | Furuuchi et al. |
| 8,326,598 B1 | 12/2012 | Macherey et al. |

(56) References Cited

U.S. PATENT DOCUMENTS

| | | |
|---|---|---|
| 8,352,244 B2 | 1/2013 | Gao et al. |
| 8,364,463 B2 | 1/2013 | Miyamoto |
| 8,380,486 B2 | 2/2013 | Soricut et al. |
| 8,386,234 B2 | 2/2013 | Uchimoto et al. |
| 8,423,346 B2 | 4/2013 | Seo et al. |
| 8,433,556 B2 | 4/2013 | Fraser et al. |
| 8,442,812 B2 | 5/2013 | Ehsani |
| 8,442,813 B1 | 5/2013 | Popat |
| 8,468,149 B1 | 6/2013 | Lung et al. |
| 8,504,351 B2 | 8/2013 | Weibel et al. |
| 8,521,506 B2 | 8/2013 | Lancaster et al. |
| 8,527,260 B2 | 9/2013 | Best |
| 8,543,563 B1 | 9/2013 | Nikoulina et al. |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight et al. |
| 8,606,900 B1 | 12/2013 | Levergood et al. |
| 8,612,203 B2 | 12/2013 | Foster et al. |
| 8,612,205 B2 | 12/2013 | Hanneman et al. |
| 8,615,388 B2 | 12/2013 | Li |
| 8,615,389 B1 | 12/2013 | Marcu |
| 8,635,327 B1 | 1/2014 | Levergood et al. |
| 8,635,539 B2 | 1/2014 | Young et al. |
| 8,655,642 B2 | 2/2014 | Fux et al. |
| 8,666,725 B2 | 3/2014 | Och |
| 8,676,563 B2 | 3/2014 | Soricut et al. |
| 8,688,454 B2 | 4/2014 | Zheng |
| 8,694,303 B2 | 4/2014 | Hopkins et al. |
| 8,725,496 B2 | 5/2014 | Zhao et al. |
| 8,762,128 B1 | 6/2014 | Brants et al. |
| 8,768,686 B2 | 7/2014 | Sarikaya et al. |
| 8,775,154 B2 | 7/2014 | Clinchant |
| 8,818,790 B2 | 8/2014 | He et al. |
| 8,825,466 B1 | 9/2014 | Wang et al. |
| 8,831,928 B2 | 9/2014 | Marcu et al. |
| 8,843,359 B2 | 9/2014 | Lauder |
| 8,862,456 B2 | 10/2014 | Krack et al. |
| 8,886,515 B2 | 11/2014 | Van Assche |
| 8,886,517 B2 | 11/2014 | Soricut et al. |
| 8,886,518 B1 | 11/2014 | Wang et al. |
| 8,898,052 B2 | 11/2014 | Waibel |
| 8,903,707 B2 | 12/2014 | Zhao |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,942,973 B2 | 1/2015 | Viswanathan |
| 8,943,080 B2 | 1/2015 | Marcu et al. |
| 8,972,268 B2 | 3/2015 | Waibel |
| 8,977,536 B2 | 3/2015 | Och |
| 8,990,064 B2 | 3/2015 | Marcu et al. |
| 9,026,425 B2 | 5/2015 | Nikoulina |
| 9,053,202 B2 | 6/2015 | Viswanadha |
| 9,081,762 B2 | 7/2015 | Wu et al. |
| 9,122,674 B1 | 9/2015 | Wong et al. |
| 9,141,606 B2 | 9/2015 | Marciano |
| 9,152,622 B2 | 10/2015 | Marcu et al. |
| 9,176,952 B2 | 11/2015 | Aikawa |
| 9,183,192 B1 | 11/2015 | Ruby, Jr. |
| 9,183,198 B2 | 11/2015 | Shen et al. |
| 9,197,736 B2 | 11/2015 | Davis et al. |
| 9,201,870 B2 | 12/2015 | Jurach |
| 9,208,144 B1 | 12/2015 | Abdulnasyrov |
| 9,213,694 B2 | 12/2015 | Hieber et al. |
| 9,396,184 B2 | 7/2016 | Roy |
| 9,465,797 B2 | 10/2016 | Ji |
| 9,471,563 B2 | 10/2016 | Trese |
| 9,519,640 B2 | 12/2016 | Perez |
| 9,552,355 B2 | 1/2017 | Dymetman |
| 9,600,473 B2 | 3/2017 | Leydon |
| 9,613,026 B2 | 4/2017 | Hodson |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1* | 4/2002 | Marcu ................. 704/4 |
| 2002/0046018 A1* | 4/2002 | Marcu et al. ................. 704/9 |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0083029 A1 | 6/2002 | Chun et al. |
| 2002/0083103 A1 | 6/2002 | Ballance |
| 2002/0086268 A1* | 7/2002 | Shpiro ............... G09B 7/02 434/156 |
| 2002/0087313 A1 | 7/2002 | Lee et al. |
| 2002/0099744 A1 | 7/2002 | Coden et al. |
| 2002/0107683 A1 | 8/2002 | Eisele |
| 2002/0111788 A1 | 8/2002 | Kimpara |
| 2002/0111789 A1 | 8/2002 | Hull |
| 2002/0111967 A1 | 8/2002 | Nagase |
| 2002/0115044 A1* | 8/2002 | Shpiro ............... G09B 5/06 434/156 |
| 2002/0124109 A1 | 9/2002 | Brown |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0004705 A1 | 1/2003 | Kempe |
| 2003/0009320 A1 | 1/2003 | Furuta |
| 2003/0009322 A1 | 1/2003 | Marcu |
| 2003/0014747 A1 | 1/2003 | Spehr |
| 2003/0023423 A1 | 1/2003 | Yamada et al. |
| 2003/0040900 A1 | 2/2003 | D'Agostini |
| 2003/0061022 A1 | 3/2003 | Reinders |
| 2003/0077559 A1* | 4/2003 | Braunberger ............ G09B 7/00 434/322 |
| 2003/0129571 A1* | 7/2003 | Kim ................. 434/156 |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0192046 A1 | 10/2003 | Spehr |
| 2003/0200094 A1 | 10/2003 | Gupta |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0023193 A1* | 2/2004 | Wen et al. ................. 434/167 |
| 2004/0024581 A1 | 2/2004 | Koehn et al. |
| 2004/0030551 A1* | 2/2004 | Marcu ................. G06F 17/2818 704/240 |
| 2004/0034520 A1 | 2/2004 | Langkilde-Geary |
| 2004/0035055 A1 | 2/2004 | Zhu et al. |
| 2004/0044517 A1 | 3/2004 | Palmquist |
| 2004/0044530 A1 | 3/2004 | Moore |
| 2004/0059708 A1 | 3/2004 | Dean et al. |
| 2004/0059730 A1* | 3/2004 | Zhou ................. G06F 17/274 |
| 2004/0068411 A1 | 4/2004 | Scanlan |
| 2004/0093327 A1 | 5/2004 | Anderson et al. |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1* | 6/2004 | Butt ............... 434/156 |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0176945 A1 | 9/2004 | Inagaki et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0255281 A1 | 12/2004 | Imamura et al. |
| 2004/0260532 A1 | 12/2004 | Richardson et al. |
| 2005/0021322 A1 | 1/2005 | Richardson et al. |

(56) References Cited

U.S. PATENT DOCUMENTS

| | | |
|---|---|---|
| 2005/0021323 A1* | 1/2005 | Li .................................. 704/5 |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0054444 A1* | 3/2005 | Okada .................. A63F 13/12 463/42 |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1* | 5/2005 | Quirk et al. .................. 704/4 |
| 2005/0107999 A1 | 5/2005 | Kempe et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0171944 A1 | 8/2005 | Palmquist |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0095526 A1 | 5/2006 | Levergood et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0136193 A1 | 6/2006 | Lux-Pogodalla et al. |
| 2006/0136824 A1 | 6/2006 | Lin |
| 2006/0142995 A1 | 6/2006 | Knight et al. |
| 2006/0150069 A1 | 7/2006 | Chang |
| 2006/0165040 A1 | 7/2006 | Rathod et al. |
| 2006/0167984 A1 | 7/2006 | Fellenstein et al. |
| 2006/0190241 A1 | 8/2006 | Goutte et al. |
| 2006/0282255 A1 | 12/2006 | Lu et al. |
| 2007/0015121 A1* | 1/2007 | Johnson et al. .............. 434/156 |
| 2007/0016400 A1 | 1/2007 | Soricutt et al. |
| 2007/0016401 A1 | 1/2007 | Ehsani et al. |
| 2007/0016918 A1 | 1/2007 | Alcorn et al. |
| 2007/0020604 A1* | 1/2007 | Chulet .................. G09B 7/02 434/350 |
| 2007/0033001 A1 | 2/2007 | Muslea et al. |
| 2007/0043553 A1 | 2/2007 | Dolan |
| 2007/0050182 A1 | 3/2007 | Sneddon et al. |
| 2007/0060114 A1 | 3/2007 | Ramer et al. |
| 2007/0073532 A1 | 3/2007 | Brockett et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0168202 A1 | 7/2007 | Changela et al. |
| 2007/0168450 A1 | 7/2007 | Prajapat et al. |
| 2007/0180373 A1 | 8/2007 | Bauman et al. |
| 2007/0208719 A1 | 9/2007 | Tran |
| 2007/0219774 A1 | 9/2007 | Quirk et al. |
| 2007/0233460 A1 | 10/2007 | Lancaster et al. |
| 2007/0233547 A1 | 10/2007 | Younger et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0040095 A1 | 2/2008 | Sinha et al. |
| 2008/0052061 A1 | 2/2008 | Kim et al. |
| 2008/0065478 A1 | 3/2008 | Kohlmeier et al. |
| 2008/0065974 A1 | 3/2008 | Campbell |
| 2008/0086298 A1 | 4/2008 | Anismovich |
| 2008/0109209 A1 | 5/2008 | Fraser et al. |
| 2008/0109374 A1 | 5/2008 | Levergood et al. |
| 2008/0114583 A1 | 5/2008 | Al-Onaizan et al. |
| 2008/0154577 A1 | 6/2008 | Kim et al. |
| 2008/0154581 A1 | 6/2008 | Lavi et al. |
| 2008/0183555 A1 | 7/2008 | Walk |
| 2008/0195461 A1 | 8/2008 | Li et al. |
| 2008/0201344 A1 | 8/2008 | Levergood et al. |
| 2008/0215418 A1 | 9/2008 | Kolve et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0288240 A1 | 11/2008 | D'Agostini |
| 2008/0300857 A1 | 12/2008 | Barbaiani et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0094017 A1 | 4/2009 | Chen |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0198487 A1 | 8/2009 | Wong et al. |
| 2009/0217196 A1 | 8/2009 | Neff et al. |
| 2009/0234634 A1 | 9/2009 | Chen et al. |
| 2009/0234635 A1 | 9/2009 | Bhatt et al. |
| 2009/0240539 A1 | 9/2009 | Slawson |
| 2009/0241115 A1 | 9/2009 | Raffo et al. |
| 2009/0248662 A1 | 10/2009 | Murdock |
| 2009/0313005 A1 | 12/2009 | Jaquinta |
| 2009/0313006 A1 | 12/2009 | Tang |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0057439 A1 | 3/2010 | Ideuchi et al. |
| 2010/0057561 A1 | 3/2010 | Gifford |
| 2010/0121630 A1 | 5/2010 | Mende et al. |
| 2010/0138210 A1 | 6/2010 | Seo et al. |
| 2010/0138213 A1 | 6/2010 | Bicici et al. |
| 2010/0158238 A1 | 6/2010 | Saushkin |
| 2010/0174524 A1 | 7/2010 | Koehn |
| 2010/0179803 A1 | 7/2010 | Sawaf |
| 2011/0029300 A1 | 2/2011 | Marcu et al. |
| 2011/0066469 A1 | 3/2011 | Kadosh |
| 2011/0066643 A1 | 3/2011 | Cooper et al. |
| 2011/0082683 A1 | 4/2011 | Soricut et al. |
| 2011/0082684 A1 | 4/2011 | Soricut et al. |
| 2011/0097693 A1 | 4/2011 | Crawford |
| 2011/0184722 A1 | 7/2011 | Sneddon et al. |
| 2011/0191096 A1 | 8/2011 | Sarikaya et al. |
| 2011/0191410 A1 | 8/2011 | Refuah et al. |
| 2011/0225104 A1 | 9/2011 | Soricut et al. |
| 2011/0289405 A1 | 11/2011 | Fritsch et al. |
| 2012/0016657 A1 | 1/2012 | He et al. |
| 2012/0022852 A1 | 1/2012 | Tregaskis |
| 2012/0096019 A1 | 4/2012 | Manickam et al. |
| 2012/0116751 A1 | 5/2012 | Bernardini et al. |
| 2012/0136646 A1 | 5/2012 | Kraenzel et al. |
| 2012/0150441 A1 | 6/2012 | Ma et al. |
| 2012/0150529 A1 | 6/2012 | Kim et al. |
| 2012/0191457 A1 | 7/2012 | Minnis et al. |
| 2012/0232885 A1 | 9/2012 | Barbosa et al. |
| 2012/0253783 A1 | 10/2012 | Castelli et al. |
| 2012/0265711 A1 | 10/2012 | Assche |
| 2012/0278302 A1 | 11/2012 | Choudhury et al. |
| 2012/0323554 A1 | 12/2012 | Hopkins et al. |
| 2012/0330990 A1 | 12/2012 | Chen et al. |
| 2013/0018650 A1 | 1/2013 | Moore et al. |
| 2013/0024184 A1 | 1/2013 | Vogel et al. |
| 2013/0103381 A1 | 4/2013 | Assche |
| 2013/0124185 A1 | 5/2013 | Sarr et al. |
| 2013/0144594 A1 | 6/2013 | Bangalore et al. |
| 2013/0173247 A1 | 7/2013 | Hodson |

(56) References Cited

U.S. PATENT DOCUMENTS

| | | |
|---|---|---|
| 2013/0238310 A1 | 9/2013 | Viswanathan |
| 2013/0290339 A1 | 10/2013 | LuVogt et al. |
| 2013/0325442 A1 | 12/2013 | Dahlmeier |
| 2014/0006003 A1 | 1/2014 | Soricut et al. |
| 2014/0019114 A1 | 1/2014 | Travieso et al. |
| 2014/0058718 A1 | 2/2014 | Kunchukuttan |
| 2014/0142917 A1 | 5/2014 | D'Penha |
| 2014/0142918 A1 | 5/2014 | Dotterer |
| 2014/0149102 A1 | 5/2014 | Marcu et al. |
| 2014/0188453 A1 | 7/2014 | Marcu et al. |
| 2014/0229257 A1 | 8/2014 | Reistad et al. |
| 2014/0297252 A1 | 10/2014 | Prasad et al. |
| 2014/0350931 A1 | 11/2014 | Levit et al. |
| 2014/0358519 A1 | 12/2014 | Mirkin |
| 2014/0358524 A1 | 12/2014 | Papula |
| 2014/0365201 A1 | 12/2014 | Gao |
| 2015/0051896 A1 | 2/2015 | Simard et al. |
| 2015/0106076 A1 | 4/2015 | Hieber et al. |
| 2015/0186362 A1 | 7/2015 | Li |
| 2019/0042566 A1 | 2/2019 | Marcu et al. |

FOREIGN PATENT DOCUMENTS

| | | |
|---|---|---|
| AU | 5202299 A | 10/1999 |
| CA | 2221506 A1 | 12/1996 |
| CA | 2408819 | 11/2006 |
| CA | 2475857 | 12/2008 |
| CA | 2480398 | 6/2011 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| DE | 1488338 | 4/2010 |
| DE | 202005022113.9 | 2/2014 |
| EP | 0469884 A2 | 2/1992 |
| EP | 0715265 A2 | 6/1996 |
| EP | 0830774 A2 | 3/1998 |
| EP | 0933712 A2 | 8/1999 |
| EP | 0933712 A3 | 1/2001 |
| EP | 1128301 A2 | 8/2001 |
| EP | 1128302 A2 | 8/2001 |
| EP | 1128303 A2 | 8/2001 |
| EP | 0803103 A1 | 2/2002 |
| EP | 1235177 A2 | 8/2002 |
| EP | 0734556 B1 | 9/2002 |
| EP | 1488338 | 9/2004 |
| EP | 0830774 B1 | 10/2004 |
| EP | 1489523 A2 | 12/2004 |
| EP | 1488338 | 4/2010 |
| EP | 2299369 A1 | 3/2011 |
| ES | 1488338 | 4/2010 |
| FR | 1488338 | 4/2010 |
| GB | 2241359 A | 8/1991 |
| GB | 1488338 | 4/2010 |
| HK | 1072987 | 2/2006 |
| HK | 1072987 | 9/2010 |
| JP | 7244666 | 1/1995 |
| JP | H08101837 A | 4/1996 |
| JP | 1011447 | 1/1998 |
| JP | H10509543 A | 9/1998 |
| JP | H11507752 A | 7/1999 |
| JP | 11272672 | 10/1999 |
| JP | 3190881 B2 | 7/2001 |
| JP | 3190882 B2 | 7/2001 |
| JP | 3260693 B2 | 2/2002 |
| JP | 3367675 B2 | 1/2003 |
| JP | 2003157402 A | 5/2003 |
| JP | 2004501429 | 1/2004 |
| JP | 2004062726 | 2/2004 |
| JP | 3762882 B2 | 4/2006 |
| JP | 2006216073 A | 8/2006 |
| JP | 2007042127 A | 2/2007 |
| JP | 2008101837 | 5/2008 |
| JP | 4485548 B2 | 6/2010 |
| JP | 4669373 B2 | 4/2011 |
| JP | 4669430 B2 | 4/2011 |
| JP | 5452868 | 1/2014 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9819224 A2 | 5/1998 |
| WO | WO9952626 A1 | 10/1999 |
| WO | WO2002039318 A1 | 5/2002 |
| WO | WO03083709 | 10/2003 |
| WO | WO2003083710 | 10/2003 |
| WO | WO2004042615 | 5/2004 |
| WO | WO2007056563 | 5/2007 |
| WO | WO2007068123 A1 | 6/2007 |
| WO | WO2010062540 A1 | 6/2010 |
| WO | WO2010062542 A1 | 6/2010 |
| WO | WO2011041675 | 4/2011 |
| WO | WO2011162947 | 12/2011 |

OTHER PUBLICATIONS

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bangalore, S. and Rambow, O., "Evaluation Metrics for Generation," 2000, Proc. of the 1st International Natural Language Generation Conf., vol. 14, p. 1-8.

Bangalore, S. and Rambow, O., "Using TAGs, a Tree Model, and a Language Model for Generation," May 2000, Workshop TAG+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

(56) References Cited

OTHER PUBLICATIONS

Brown et al., "Word-Sense Disambiguation Using Statistical Methods," 1991, Proc. of 29th Annual ACL, pp. 264-270.
Carl, Michael. "A Constructivist Approach to Machine Translation," 1998, New Methods of Language Processing and Computational Natural Language Learning, pp. 247-256.
Chen, K. and Chen, H., "Machine Translation: An Integrated Approach," 1995, Proc. of 6th Int'l Conf. on Theoretical and Methodological Issue in MT, pp. 287-294.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.
Dagan, I. and Itai, A., "Word Sense Disambiguation Using a Second Language Monolingual Corpus", 1994, Computational Linguistics, vol. 20, No. 4, pp. 563-596.
Dempster et al., "Maximum Likelihood from Incomplete Data via the EM Algorithm", 1977, Journal of the Royal Statistical Society, vol. 39, No. 1, pp. 1-38.
Diab, M. and Finch, S., "A Statistical Word-Level Translation Model for Comparable Corpora," 2000, In Proc.of the Conference on ContentBased Multimedia Information Access (RIAO).
Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.
Elhadad, M. and Robin, J., "Controlling Content Realization with Functional Unification Grammars", 1992, Aspects of Automated Natural Language Generation, Dale et al. (eds)., Springer Verlag, pp. 89-104.
Elhadad et al., "Floating Constraints in Lexical Choice", 1996, ACL, 23(2): 195-239.
Elhadad, Michael, "FUF: the Universal Unifier User Manual Version 5.2", 1993, Department of Computer Science, Ben Gurion University, Beer Sheva, Israel.
Elhadad. M. and Robin, J., "SURGE: a Comprehensive Plug-in Syntactic Realization Component for Text Generation", 1999 (available at http://www.cs.bgu.ac.il/~elhadad/pub.html).
Elhadad, Michael, "Using Argumentation to Control Lexical Choice: A Functional Unification Implementation", 1992, Ph.D. Thesis, Graduate School of Arts and Sciences, Columbia University.
Fung, Pascale, "Compiling Bilingual Lexicon Entries From a Non-Parallel English-Chinese Corpus", 1995, Proc. of the Third Workshop on Very Large Corpora, Boston, MA, pp. 173-183.
Fung, P. and Yee, L., "An IR Approach for Translating New Words from Nonparallel, Comparable Texts", 1998, 36th Annual Meeting of the ACL, 17th International Conference on Computational Linguistics, pp. 414-420.
Gale, W. and Church, K., "A Program for Aligning Sentences in Bilingual Corpora," 1991, 29th Annual Meeting of the ACL, pp. 177-183.
Germann, Ulrich, "Building a Statistical Machine Translation System from Scratch: How Much Bang for the Buck Can We Expect?" Proc. of the Data-Driven MT Workshop of ACL-01, Toulouse, France, 2001.
Germann et al., "Fast Decoding and Optimal Decoding for Machine Translation", 2001, Proc. of the 39th Annual Meeting of the ACL, Toulouse, France, pp. 228-235.
Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.
Grefenstette, Gregory, "The World Wide Web as a Resource for Example-Based Machine Translation Tasks", 1999, Translating and the Computer 21, Proc. of the 21st International Conf. on Translating and the Computer, London, UK, 12 pp.
Hatzivassiloglou, V. et al, "Unification-Based Glossing", 1995, Proc. of the International Joint Conference on Artificial Intelligence, pp. 1382-1389.
Ide, N. and Veronis, J., "Introduction to the Special Issue on Word Sense Disambiguation: The State of the Art", Mar. 1998, Computational Linguistics, vol. 24, Issue 1, pp. 2-40.
Imamura, Kenji, "Hierarchical Phrase Alignment Harmonized with Parsing", 2001, in Proc. of NLPRS, Tokyo.
Jelinek, F., "Fast Sequential Decoding Algorithm Using a Stack", Nov. 1969, IBM J. Res. Develop., vol. 13, No. 6, pp. 675-685.
Jones, K. Sparck, "Experiments in Relevance Weighting of Search Terms", 1979, Information Processing & Management, vol. 15, Pergamon Press Ltd., UK, pp. 133-144.
Knight, K. and Yamada, K., "A Computational Approach to Deciphering Unknown Scripts," 1999, Proc. of the ACL Workshop on Unsupervised Learning in Natural Language Processing.
Knight, K. and Al-Onaizan, Y., "A Primer on Finite-State Software for Natural Language Processing", 1999 (available at http://www.isi.edu/licensed-sw/carmel).
Knight, Kevin, "A Statistical MT Tutorial Workbook," 1999, JHU Summer Workshop (available at http://www.isi.edu/natural-language/mt/wkbk.rtf).
Knight, Kevin, "Automating Knowledge Acquisition for Machine Translation," 1997, AI Magazine 18(4).
Knight, K. and Chander, I., "Automated Postediting of Documents," 1994, Proc. of the 12th Conference on Artificial Intelligence, pp. 779-784.
Knight, K. and Luk, S., "Building a Large-Scale Knowledge Base for Machine Translation," 1994, Proc. of the 12th Conference on Artificial Intelligence, pp. 773-778.
Knight, Kevin, "Connectionist Ideas and Algorithms," Nov. 1990, Communications of the ACM, vol. 33, No. 11, pp. 59-74.
Knight, Kevin, "Decoding Complexity in Word-Replacement Translation Models", 1999: Computational Linguistics, 25(4).
Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.
Knight, Kevin, "Integrating Knowledge Acquisition and Language Acquisition," May 1992, Journal of Applied Intelligence, vol. 1, No. 4.
Knight et al., "Integrating Knowledge Bases and Statistics in MT," 1994, Proc. of the Conference of the Association for Machine Translation in the Americas.
Knight, Kevin, "Learning Word Meanings by Instruction," 1996, Proc. of the National Conference on Artificial Intelligence: vol. 1, pp. 447-454.
Knight, K. and Al-Onaizan, Y., "Machine Transliteration", 1997, Proc. of the ACL-97, Madrid, Spain.
Knight, K. et al., "Machine Transliteration of Names in Arabic Text," 2002, Proc. of the ACL Workshop on Computational Approaches to Semitic Languages.
Knight, K. and Marcu, D., "Statistics-Based Summarization—Step One: Sentence Compression," 2000, American Association for Artificial Intelligence Conference, pp. 703-710.
Knight et al., "Translation with Finite-State Devices," 1998, Proc. of the 3rd AMTA Conference, pp. 421-437.
Knight, K. and Hatzivassiloglou, V., "Two-Level, Many-Paths Generation," 1995, Proc. of the 33rd Annual Conference of the ACL, pp. 252-260.
Knight, Kevin, "Unification: A Multidisciplinary Survey," 1989, ACM Computing Surveys, vol. 21, No. 1.
Koehn, P. and Knight, K., "ChunkMT: Statistical Machine Translation with Richer Linguistic Knowledge," Apr. 2002, Information Sciences Institution.
Koehn, P. and Knight, K., "Estimating Word Translation Probabilities from Unrelated Monolingual Corpora Using the EM Algorithm," 2000, Proc. of the 17th meeting of the AAAI.
Koehn, P. and Knight, K., "Knowledge Sources for Word-Level Translation Models," 2001, Conference on Empirical Methods in Natural Language Processing.

(56) References Cited

OTHER PUBLICATIONS

Kurohashi, S. and Nagao, M., "Automatic Detection of Discourse Structure by Checking Surface Information in Sentences," 1994, Proc. of COL-LING '94, vol. 2, pp. 1123-1127.
Langkilde-Geary, Irene, "An Empirical Verification of Coverage and Correctness for a General-Purpose Sentence Generator," 1998, Proc. 2nd Int'l Natural Language Generation Conference.
Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.
Langkilde, Irene, "Forest-Based Statistical Sentence Generation," 2000, Proc. of the 1st Conference on North American chapter of the ACL, Seattle, WA, pp. 170-177.
Langkilde, I. and Knight, K., "The Practical Value of N-Grams in Generation," 1998, Proc. of the 9th International Natural Language Generation Workshop, p. 248-255.
Langkilde, I. and Knight, K., "Generation that Exploits Corpus-Based Statistical Knowledge," 1998, Proc. of the COLING-ACL, pp. 704-710.
Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.
Manning, C. and Schutze, H., "Foundations. of Statistical Natural Language Processing," 2000, The MIT Press, Cambridge, MA [redacted].
Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.
Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACL/EACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory- and Statistical-Based Machine Translation," 2001, Proc. of the 39th Annual Meeting of the ACL, pp. 378-385.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.
Melamed, I. Dan, "Empirical Methods for Exploiting Parallel Texts," 2001, MIT Press, Cambridge, MA [table of contents].
Meng et al., "Generating Phonetic Cognates to Handle Named Entities in English-Chinese Cross-Language Spoken Document Retrieval," 2001, IEEE Workshop on Automatic Speech Recognition and Understanding, pp. 311-314.
Miike et al., "A full-text retrieval system with a dynamic abstract generation function," 1994, Proceedings of SI-GIR '94, pp. 152-161.
Mikheev et al., "Named Entity Recognition without Gazeteers," 1999, Proc. of European Chapter of the ACL, Bergen, Norway, pp. 1-8.
Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.
Niessen, S. and Ney, H, "Toward hierarchical models for statistical machine translation of inflected languages," 2001, Data-Driven Machine Translation Workshop, Toulouse, France, pp. 47-54.
Och, F. and Ney, H, "Improved Statistical Alignment Models," 2000, 38th Annual Meeting of the ACL, Hong Kong, pp. 440-447.
Och et al., "Improved Alignment Models for Statistical Machine Translation," 1999, Proc. of the Joint Conf. of Empirical Methods in Natural Language Processing and Very Large Corpora, pp. 20-28.
Papineni et al., "Bleu: a Method for Automatic Evaluation of Machine Translation," 2001, IBM Research Report, RC22176(WO102-022).
Pla et al., "Tagging and Chunking with Bigrams," 2000, Proc. of the 18th Conference on Computational Linguistics, vol. 2, pp. 614-620.
Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Resnik, P. and Yarowsky, D., "A Perspective on Word Sense Disambiguation Methods and Their Evaluation," 1997, Proceedings of SIGLEX '97, Washington, DC, pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hill Book Company [redacted].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Sang, E. and Buchholz, S., "Introduction to the CoNLL-2000 Shared Task: Chunking," 20002, Proc. of CoNLL-2000 and LLL-2000, Lisbon, Portugal, pp. 127-132.
Schmid, H., and Walde, S., "Robust German Noun Chunking With a Probabilistic Context-Free Grammar," 2000, Proc. of the 18th Conference on Computational Linguistics, vol. 2, pp. 726-732.
Selman et al., "A New Method for Solving Hard Satisfiability Problems," 1992, Proc. of the 10th National Conference on Artificial Intelligence, San Jose, CA, pp. 440-446.
Schutze, Hinrich, "Automatic Word Sense Discrimination," 1998, Computational Linguistics, Special Issue on Word Sense Disambiguation, vol. 24, Issue 1, pp. 97-123.
Sobashima et al., "A Bidirectional Transfer-Driven Machine Translation System for Spoken Dialogues," 1994, Proc. of 15th Conference on Computational Linguistics, vol. 1, pp. 64-68.
Shapiro, Stuart (ed.), "Encyclopedia of Artificial Intelligence, 2nd edition", vol. 2, 1992, John Wiley & Sons Inc; "Unification" article, K. Knight, pp. 1630-1637.
Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the COLING/ACL Workkshop on Computational Approaches to Semitic Language.
Sun et al., "Chinese Named Entity Identification Using Class-based Language Model," 2002, Proc. of 19th International Conference on Computational Linguistics, Taipei, Taiwan, vol. 1, pp. 1-7.
Sumita et al., "A Discourse Structure Analyzer for Japanese Text," 1992, Proc. of the International Conference on FIfth Generation Computer Systems, vol. 2, pp. 1133-1140.
Taylor et al., "The Penn Treebank: An Overview," in A. Abeill (ed.), Treebanks: Building and Using Parsed Corpora, 2003, pp. 5-22.

(56) References Cited

OTHER PUBLICATIONS

Tiedemann, Jorg, "Automatic Construction of Weighted String Similarity Measures," 1999, In Proceedings of the Joint SIGDAT Conference on Emperical Methods in Natural Language Processing and Very Large Corpora.
Tillmann et al., "A DP based Search Using Monotone Alignments in Statistical Translation," 1997, Proc. of the Annual Meeting of the ACL, pp. 366-372.
Tillman, C. and Xia, F., "A Phrase-Based Unigram Model for Statistical Machine Translation," 2003, Proc. of the North American Chapter of the ACL on Human Language Technology, vol. 2, pp. 106-108.
Veale, T. and Way, A., "Gaijin: A Bootstrapping, Template-Driven Approach to Example-Based MT," 1997, Proc. of New Methods in Natural Language Processing (NEMPLP97), Sofia, Bulgaria.
Vogel, S. and Ney, H., "Construction of a Hierarchical Translation Memory," 2000, Proc. of Cooling 2000, Saarbrucken, Germany, pp. 1131-1135.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual Speech Communication, pp. 69-74.
Wang, Ye-Yi, "Grammar Interference and Statistical Machine Translation," 1998, Ph.D Thesis, Carnegie Mellon University, Pittsburgh, PA.
Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.
Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.
Wang, Y. and Waibel, A., "Decoding Algorithm in Statistical Machine Translation," 1996, Proc. of the 35th Annual Meeting of the ACL, pp. 366-372.
Wu, Dekai, "Stochastic Inversion Transduction Grammars and Bilingual Parsing of Parallel Corpora," 1997, Computational Linguistics, vol. 23, Issue 3, pp. 377-403.
Wu, Dekai, "A Polynomial-Time Algorithm for Statistical Machine Translation," 1996, Proc. of 34th Annual Meeting of the ACL, pp. 152-158.
Yamada, K. and Knight, K., "A Decoder for Syntax-based Statistical MT," 2001, Proceedings of the 40th Annual Meeting of the ACL, pp. 303-310.
Yamada, K. and Knight, K. "A Syntax-based Statistical Translation Model," 2001, Proc. of the 39th Annual Meeting of the ACL, pp. 523-530.
Yamamoto et al., "A Comparative Study on Translation Units for Bilingual Lexicon Extraction," 2001, Japan Academic Association for Copyright Clearance, Tokyo, Japan.
Yarowsky, David, "Unsupervised Word Sense Disambiguation Rivaling Supervised Methods," 1995, 33rd Annual Meeting of the ACL, pp. 189-196.
Callan et al., "TREC and TIPSTER Experiments with INQUERY," 1994, Information Processing and Management, vol. 31, Issue 3, pp. 327-343.
Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.
Nederhof, M. and Satta, G., "IDL-Expressions: A Formalism for Representing and Parsing Finite Languages in Natural Language Processing," 2004, Journal of Artificial Intelligence Research, vol. 21, pp. 281-287.
Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.
Russell, S. and Norvig, P., "Artificial Intelligence: A Modern Approach," 1995, Prentice-Hall, Inc., New Jersey [redacted—table of contents].
Ueffing et al., "Generation of Word Graphs in Statistical Machine Translation," 2002, Proc. of Empirical Methods in Natural Language Processing (EMNLP), pp. 156-163.
Kumar, R. and Li, H., "Integer Programming Approach to Printed Circuit Board Assembly Time Optimization," 1995, IEEE Transactions on Components, Packaging, and Manufacturing,.
Yossi, Cohen, "Interpreter for FUF," Jul. 30, 1997, (available at ftp://ftp.cs.bgu.ac.il/pub/people/elhadad/fuf-life.lf).
Rayner et al., "Hybrid Language Processing in the Spoken Language Translator," IEEE, pp. 107-110. (NPL0165).
Rogati et al., "Resource Selection for Domain-Specific Cross-Lingual IR," ACM 2004, pp. 154-161. (NPL0172).
Ruiqiang, Z. et al., "The NiCT-ATR Statistical Machine Translation System for the IWSLT 2006 Evaluation," submitted to IWSLT, 2006. (NPL0173).
Kumar, S. and Byrne, W., "Minimum Bayes-Risk Decoding for Statistical Machine Translation." HITNAACL Conference. Mar. 2004, 8 pages. (NPL0179).
Shirai, S., "A Hybrid Rule and Example-based Method for Machine Translation," NTT Communication Science Laboratories, pp. 1-5. (NPL0181).
Tanaka, K. and Iwasaki, H. "Extraction of Lexical Translations from Non-Aligned Corpora," Proceedings of COLING 1996. (NPL0187).
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ. (NPL0189).
Tomas, J., "Binary Feature Classification for Word Disambiguation in Statistical Machine Translation," Proceedings of the 2nd Int'l. Workshop on Pattern Recognition, 2002, pp. 1-12. (NPL0194).
Uchimoto, K. et al., "Word Translation by Combining Example-based Methods and Machine Learning Models," Natural Language Processing (Shizen Gengo Shori), vol. 10, No. 3, Apr. 2003, pp. 87-114. (NPL0195).
Uchimoto, K. et al., "Word Translation by Combining Example-based Methods and Machine Learning Models," Natural Language Processing (Shizen Gengo Shori), vol. 10, No. 3, Apr. 2003, pp. 87-114. (English Translation) (NPL0196).
Varga et al, "Parallel corpora for medium density languages", In Proceedings of RANLP 2005, pp. 590-596 (NPL0198).
Yamada K., "A Syntax-Based Statistical Translation Model," 2002 PhD Dissertation, pp. 1-141. (NPL0212).
Yamamoto et al, "Acquisition of Phrase-level Bilingual Correspondence using Dependency Structure" In Proceedings of COLING—2000, pp. 933-939 (NPL0214).
Zhang et al., "Synchronous Binarization for Machine Translations," Jun. 4-9, 2006, in Proc. of the Human Language Technology Conference of the North American Chapter of the ACL, pp. 256-263. (NPL0217).
Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223. (NPL0218).
Patent Cooperation Treaty International Preliminary Report on Patentability and the Written Opinion, International application No. PCT/US2008/004296, dated Oct. 6, 2009, 5 pgs. (NPL0219).
Document, Wikipedia.com, web.archive.org (Feb. 24, 2004) <http://web.archive.org/web/20040222202831 /http://en.wikipedia.org/wikiiDocument>, Feb. 24, 2004 (NPL0220).
Identifying, Dictionary.com, wayback.archive.org (Feb. 28, 2007) <http://wayback.archive.org/web/200501 01OOOOOO*/http:////dictionary.reference.com//browse//identifying>, Feb. 28, 2005 <http://web.archive.org/web/20070228150533/http://dictionary.reference.com/browse/identifying> (NPL0221).

(56) References Cited

OTHER PUBLICATIONS

Agbago, A., et al., "True-casing for the Portage System," In Recent Advances in Natural Language Processing (Borovets, Bulgaria), Sep. 21-23, 2005, pp. 21-24. (NPL0002).
Alshawi, Hiyan, "Head Automata for Speech Translation", Proceedings of the ICSLP 96, 1996, Philadelphia, Pennslyvania. (NPL0011).
Ambati, V., "Dependency Structure Trees in Syntax Based Machine Translation," Spring 2008 Report <http://www.cs.cmu.edu/~vamshi/publications/DependencyMT_report.pdf>, pp. 1-8. (NPL0012).
Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41. (NPL0014).
Ballesteros, L. et al., "Phrasal Translation and Query Expansion Techniques for Cross-Language Information," SIGIR 97, Philadelphia, PA, © 1997, pp. 84-91. (NPL0015).
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840 (NPL0020).
Berhe, G. et al., "Modeling Service-baed Multimedia Content Adaptation in Pervasive Computing," CF '04 (Ischia, Italy) Apr. 14-16, 2004, pp. 60-69. (NPL0023).
Boitet, C. et al., "Main Research Issues in Building Web Services," Proc. of the 6th Symposium on Natural Language Processing, Human and Computer Processing of Language and Speech, © 2005, pp. 1-11. (NPL0025).
Brill, Eric, "Transformation-Based Error-Driven Learning and Natural Language Processing: A Case Study in Part of Speech Tagging", 1995, Assocation for Computational Linguistics, vol. 21, No. 4, pp. 1-37 (NPL0027).
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1. (NPL0034).
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53. (NPL0037).
Cheung et al., "Sentence Alignment in Parallel, Comparable, and Quasi-comparable Corpora", In Proceedings of LREC, 2004, pp. 30-33 (NPL0038).
Cohen et al., "Spectral Bloom Filters," SIGMOD 2003, Jun. 9-12, 2003, ACM pp. 241-252 (NPL0041).
Cohen, "Hardware-Assisted Algorithm for Full-text Large-dictionary String Matching Using n-gram Hashing," 1998, Information Processing and Management, vol. 34, No. 4, pp. 443-464. (NPL0042).
Covington, "An Algorithm to Align Words for Historical Comparison", Computational Linguistics, 1996, 22(4), pp. 481-496 (NPL0045).
Eisner, Jason,"Learning Non-Isomorphic Tree Mappings for Machine Translation," 2003, In Proc. of the 41st Meeting of the ACL, pp. 205-208. (NPL0050).
Fleming, Michael et al., "Mixed-Initiative Translation of Web Pages," AMTA 2000, LNAI 1934, Springer-Verlag, Berlin, Germany, 2000, pp. 25-29. (NPL0057).
Franz Josef Och, Hermann Ney: "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps>' retrieved on May 6, 2004! abstract (NPL0058).
Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001. (NPL0059).
Fung et al, "Mining Very-non parallel corpora: Parallel sentence and lexicon extractioin via bootstrapping and EM", In EMNLP 2004 (NPL0060).
Gale, W. and Church, K., "A Program for Aligning Sentences in Bilingual Corpora," 1993, Computational Linguisitcs, vol. 19, No. 1, pp. 177-184 (NPL0064).
Galley et al., "Scalable Inference and Training of Context-Rich Syntactic Translation Models," Jul. 2006, in Proc. of the 21st International Conference on Computational Linguistics, pp. 961-968. (NPL0065).
Galley et al., "What's in a translation rule?", 2004, in Proc. of HLT/NAACL '04, pp. 1-8. (NPL0066).
Gaussier et al, "A Geometric View on Bilingual Lexicon Extraction from Comparable Corpora", In Proceedings of ACL 2004, July (NPL0067).
Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107. (NPL0070).
Grossi et al, "Suffix Trees and their applications in string algorithms", In. Proceedings of the 1st South American Workshop on String Processing, Sep. 1993, pp. 57-76 (NPL0072).
Gupta et al., "Kelips: Building an Efficient and Stable P2P DHT thorough Increased Memory and Background Overhead," 2003 IPTPS, LNCS 2735, pp. 160-169. (NPL0073).
Habash, Nizar, "The Use of a Structural N-gram Language Model in Generation-Heavy Hybrid Machine Translation," University of Maryland, Univ. Institute for Advance Computer Studies, Sep. 8, 2004. (NPL0074).
Huang et al., "Relabeling Syntax Trees to Improve Syntax-Based Machine Translation Quality," Jun. 4-9, 2006, in Proc. of the Human Language Techology Conference of the North Americna Chapter of the ACL, pp. 240-247. (NPL0076).
Imamura et al., "Feedback Cleaning of Machine Translation Rules Using Automatic Evaluation," 2003 Computational Linguistics, pp. 447-454. (NPL0079).
Klein et al., "Accurate Unlexicalized Parsing," Jul. 2003m, in Proc. of the 41st Annual Meeting of the ACL, pp. 423-430. (NPL0087).
Koehn, Philipp, "Noun Phrase Translation," A PhD Dissertation for the University of Southern California, pp. xiii, 23, 25-57, 72-81, Dec. 2003. (NPL0108).
Kupiec, Julian, "An Algorithm for Finding Noun Phrase Correspondecnes in Bilingual Corpora," In Proceedings of the 31st Annual Meeting of the ACL, 1993, pp. 17-22. (NPL0113).
Lee-Y.S.,"Neural Network Approach to Adaptive Learning: with an Application to Chinese Homophone Disambiguation," IEEE pp. 1521-1526. (NPL0120).
Lita, L., et al., "tRuEcasing," Proceedings of the 41st Annual Meeting of the Assoc. for Computational Linguistics (In Hinrichs, E. and Roth, D.- editors), pp. 152-159. (NPL0121).
Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4. (NPL0122).
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191. (NPL0133).
McDevitt, K. et al., "Designing of a Community-based Translation Center," Technical Report TR-03-30, Computer Science, Virginia Tech, © 2003, pp. 1-8. (NPL0134).
Metze, F. et al., "The NESPOLE! Speech-to-Speech Translation System," Proc. of the HLT 2002, 2nd Int'l Conf. on Human Language Technology (San Francisco, CA), © 2002, pp. 378-383. (NPL0139).
Mohri, Mehryar, "Regular Approximation of Context Free Grammars Through Transformation", 2000, pp. 251-261, "Robustness in Language and Speech Technology", Chapter 9, Kluwer Academic Publishers. (NPL0143).

(56) References Cited

OTHER PUBLICATIONS

Nagao, K. et al., "Semantic Annotation and Transcoding: Making Web Content More Accessible," IEEE Multimedia, vol. 8, Issue 2 Apr.-Jun. 2001, pp. 69-81. (NPL0146).

Norvig, Peter, "Techniques for Automatic Memoization with Applications to Context-Free Parsing", Compuational Linguistics,1991, pp. 91-98, vol. 17, No. 1 (NPL0149).

Och et al. "A Smorgasbord of Features for Statistical Machine Translation." HLTNAACL Conference. Mar. 2004, 8 pages. (NPL0151).

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096. (NPL0152).

Och, F. and Ney, H., "A Systematic Comparison of Various Statistical Alignment Models," Computational Linguistics, 2003, 29:1, 19-51. (NPL0155).

Perugini, Saviero et al., "Enhancing Usability in Citidel: Multimodal, Multilingual and Interactive Visualization Interfaces," JCDL '04, Tucson, AZ, Jun. 7-11, 2004, pp. 315-324. (NPL0158).

Petrov et al., "Learning Accurate, Compact and Interpretable Tree Annotation," Jun. 4-9, 2006, in Proc. of the Human Language Technology Conference of the North American Chapter of the ACL, pp. 433-440. (NPL0159).

Qun, Liu, "A Chinese-English Machine Translation System Based on Micro-Engine Architecture," An Int'l Conference on Translation and Information Technology, Hong Kong, Dec. 2000, pp. 1-10. (NPL0161).

Koehn, P., et al, "Statistical Phrase-Based Translation," Proceedings of HLT-NAACL 2003 Main Papers , pp. 48-54 Edmonton, May-Jun. 2003. (NPL0222).

Abney, S.P., "Stochastic Attribute Value Grammars", Association for Computional Linguistics, 1997, pp. 597-618 (NPL0223).

Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf> (NPL0224).

Tillman, C., et al, "Word Reordering and a Dynamic Programming Beam Search Algorithm for Statistical Machine Translation" <URL: http://acl.ldc.upenn.edu/J/J03/J03-1005.pdf> (NPL0225).

Wang, W., et al. "Capitalizing Machine Translation" in HLT-NAACL '06 Proceedings Jun. 2006. <http://www.isi.edu/natural-language/mt/hlt-naacl-06-wang.pdf> (NPL0226).

Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf> (NPL0227).

Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354. (NPL0228).

Frederking et al., "Three Heads are Better Than One," In Proceedings of the 4th Conference on Applied Natural Language Processing, Stuttgart, Germany, 1994, pp. 95-100. (NPL0229).

Och et al., "Discriminative Training and Maximum Entropy Models for Statistical Machine Translation," In Proc. of the 40th Annual Meeting of the Association for Computational Linguistics (ACL), Philadelphia, PA, 2002. (NPL0230).

Yasuda et al., "Automatic Machine Translation Selection Scheme to Output the Best Result," Proc of LREC, 2002, pp. 525-528. (NPL0231).

"Bangalore, S. and Rambow, O., ""Using TAGs, a Tree Model, and a Language Model for Generation,"" May 2000,Workshop TAG+5, Paris. (NPL0017)."

Gale, W. and Church, K., "A Program for Aligning Sentences in Bilingual Corpora," 1993, Computational Linguisitcs, vol. 19, No. 1, pp. 75-102 (NPL0064).

Notice of Allowance, dated Aug. 5, 2013, U.S. Appl. No. 11/250,151, filed Oct. 12, 2005.

Non-Final, dated May 9, 2013, U.S. Appl. No. 11/454,212, filed Jun. 15, 2006.

Non-Final, dated Nov. 8, 2006, U.S. Appl. No. 10/403,862, filed Mar. 28, 2003.

Allowance, dated May 15, 2013, U.S. Appl. No. 10/884,175, filed Jul. 2, 2004.

Allowance, dated Jul. 23, 2012, U.S. Appl. No. 11/087,376, filed Mar. 22, 2005.

Allowance, dated Jun. 12, 2012, U.S. Appl. No. 11/087,376, filed Mar. 22, 2005.

Final, dated Aug. 29, 2012, U.S. Appl. No. 11/250,151, filed Oct. 12, 2005.

Allowance, dated Oct. 25, 2012, U.S. Appl. No. 11/592,450, filed Nov. 2, 2006.

Non-final, dated Jul. 17, 2013, U.S. Appl. No. 11/640,157, filed Dec. 15, 2006.

Final, dated Dec. 4, 2012, U.S. Appl. No. 11/640,157, filed Dec. 15, 2006.

Allowance, dated Feb. 11, 2013, U.S. Appl. No. 11/698,501, filed Jan. 26, 2007.

Non-Final, dated Jun. 7, 2012, U.S. Appl. No. 11/698,501, filed Jan. 26, 2007.

Non-Final, dated Jun. 4, 2013, U.S. Appl. No. 11/784,161, filed Apr. 4, 2007.

Final, dated Jul. 11, 2012, U.S. Appl. No. 11/784,161, filed Apr. 4, 2007.

Non-Final, dated Jul. 2, 2012, U.S. Appl. No. 12/077,005, filed Mar. 14, 2008.

Non-Final, dated Mar. 29, 2013, U.S. Appl. No. 12/077,005, filed Mar. 14, 2008.

Final, dated Jul. 16, 2013, U.S. Appl. No. 11/811,228, filed Jun. 8, 2007.

Non-Final, dated Feb. 20, 2013, U.S. Appl. No. 11/811,228, filed Jun. 8, 2007.

Non Final, dated Aug. 22, 2012, U.S. Appl. No. 12/510,913, filed Jul. 28, 2009.

Final, dated Apr. 11, 2013, U.S. Appl. No. 12/510,913, filed Jul. 28, 2009.

Allowance, dated Oct. 9, 2012, U.S. Appl. No. 12/572,021, filed Oct. 1, 2009.

Non-Final, dated Jun. 19, 2012, U.S. Appl. No. 12/572,021, filed Oct. 1, 2009.

Non-Final, dated Jun. 27, 2012, U.S. Appl. No. 12/720,536, filed Mar. 9, 2010.

Advisory, dated Jun. 12, 2013, U.S. Appl. No. 12/720,536, filed Mar. 9, 2010.

Final, dated Apr. 24, 2013, U.S. Appl. No. 12/720,536, filed Mar. 9, 2010.

Final, dated Jun. 11, 2013, U.S. Appl. No. 12/820,061, filed Jun. 21, 2010.

Non-Final, dated Feb. 25, 2013, U.S. Appl. No. 12/820,061, filed Jun. 21, 2010.

Non-final, dated Aug. 1, 2012, U.S. Appl. No. 13/089,202, filed Apr. 18, 2011.

Final, dated Apr. 8, 2013, U.S. Appl. No. 13/089,202, filed Apr. 18, 2011.

Notice of Allowance, dated Oct. 2, 2013, U.S. Appl. No. 11/107,304, filed Apr. 15, 2005.

Non-Final Office Action, dated Sep. 11, 2013, U.S. Appl. No. 11/635,248, filed Dec. 5, 2006.

Non-Final Office Action, dated Mar. 29, 2013, U.S. Appl. No. 12/077,005, filed Mar. 14, 2008.

Advisory Action, dated Sep. 27, 2013, U.S. Appl. No. 11/811,228, filed Jun. 8, 2007.

Advisory Action, dated Jun. 20, 2013, U.S. Appl. No. 12/510,913, filed Jul. 28, 2009.

Non-Final Office Action, dated Sep. 24, 2013, U.S. Appl. No. 12/720,536, filed Mar. 9, 2010.

Non-Final Office Action, dated Sep. 23, 2013, U.S. Appl. No. 12/820,061, filed Jun. 21, 2010.

Advisory Action, dated Jun. 26, 2013, U.S. Appl. No. 13/089,202, filed Apr. 18, 2011.

(56) References Cited

OTHER PUBLICATIONS

Huang et al., "A syntax-directed translator with extended domain of locality," Jun. 9, 2006, In Proceedings of the Workshop on Computationally Hard Problmens and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Papineni et al., "Bleu: a Method for Automatic Evaluation of Machine Translation", Proc. of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Proz.com, Rates for proofreading versus Translating, http://www.proz.com/forum/business_issues/202-rates_for_proofreading_versus_translating.html, Apr. 23, 2009, retrieved Jul. 13, 2012.
Celine, Volume discounts on large translation project, naked translations, http://www.nakedtranslations.com/en/2007/volume-discounts-on-large-translation-projects/, Aug. 1, 2007, retrieved Jul. 16, 2012.
Graehl, J and Knight, K, May 2004, Training Tree Transducers, In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action dated Jun. 7, 2004 in Canadian Patent Application 2408819, filed May 11, 2001.
First Office Action dated Jun. 14, 2007 in Canadian Patent Application 2475857, filed Mar. 11, 2003.
Office Action dated Mar. 26, 2012 in German Patent Application 10392450.7, filed Mar. 28, 2003.
First Office Action dated Nov. 5, 2008 in Canadian Patent Application 2408398, filed Mar. 27, 2003.
Second Office Action dated Sep. 25, 2009 in Canadian Patent Application No. 2408398, filed Mar. 27, 2003.
First Office Action dated Mar. 1, 2005 in European Patent Application No. 03716920.8, filed Mar. 27, 2003.
Second Office Action dated Nov. 9, 2006 in European Patent Application No. 03716920.8, filed Mar. 27, 2003.
Third Office Action dated Apr. 30, 2008 in European Patent Application No. 03716920.8, filed Mar. 27, 2003.
Office Action dated Oct. 25, 2011 in Japanese Patent Application 2007-536911 filed Oct. 12, 2005.
Office Action dated Jul. 24, 2012 in Japanese Patent Application 2007-536911 filed Oct. 12, 2005.
Final Office Action dated Apr. 9, 2013 in Japanese Patent Application 2007-536911 filed Oct. 12, 2005.
Office Action dated May 13, 2005 in Chinese Patent Application 1812317.1, filed May 11, 2001.
Office Action dated Apr. 21, 2006 in Chinese Patent Application 1812317.1, filed May 11, 2001.
Office Action dated Jul. 19, 2006 in Japanese Patent Application 2003-577155, filed Mar. 11, 2003.
Office Action dated Mar. 1, 2007 in Chinese Patent Application 3805749.2, filed Mar. 11, 2003.
Office Action dated Feb. 27, 2007 in Japanese Patent Application 2002-590018, filed May 13, 2002.
Office Action dated Jan. 26, 2007 in Chinese Patent Application 3807018.9, filed Mar. 27, 2003.
Office Action dated Dec. 7, 2005 in Indian Patent Application 2283/DELNP/2004, filed Mar. 11, 2003.
Office Action dated Mar. 31, 2009 in European Patent Application 3714080.3, filed Mar. 11, 2003.
Agichtein et al., "Snowball: Extracting Information from Large Plain-Text Collections," ACM DL '00, The Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action dated Aug. 29, 2006 in Japanese Patent Application 2003-581064, filed Mar. 27, 2003.
Office Action dated Jan. 26, 2007 in Chinese Patent Application 3807027.8, filed Mar. 28, 2003.
Office Action dated Jul. 25, 2006 in Japanese Patent Application 2003-581063, filed Mar. 28, 2003.
Huang et al. Automatic Extraction of Named Entity Translingual Equivalence Based on Multi-Feature Cost Minimization. In Proceedings of the ACL 2003 Workshop on Multilingual and Mixed-Language Name Entry Recognition.
Final Office Action, dated Nov. 19, 2013, U.S. Appl. No. 11/454,212, filed Jun. 15, 2006.
PTAB Decision, dated May 5, 2011, U.S. Appl. No. 11/087,376, filed Mar. 22, 2005.
Non-Final Office Action, dated Dec. 3, 2013, U.S. Appl. No. 11/501,189, filed Aug. 7, 2006.
Final Office Action, dated Jan. 27, 2014, U.S. Appl. No. 11/784,161, filed Apr. 4, 2007.
Notice of Allowance, dated Apr. 30, 2014, U.S. Appl. No. 11/811,228, filed Jun. 8, 2007.
Non-Final Office Action, dated Nov. 20, 2013, U.S. Appl. No. 11/811,228, filed Jun. 8, 2007.
Final Office Action, dated Feb. 12, 2014, U.S. Appl. No. 12/720,536, filed Mar. 9, 2010.
Advisory Action, dated Apr. 23, 2014, U.S. Appl. No. 12/720,536, filed Mar. 9, 2010.
Office Action, dated Mar. 21, 2014, U.S. Appl. No. 13/417,071, filed Mar. 9, 2012.
Notice of Allowance, dated Nov. 14, 2013, U.S. Appl. No. 13/161,401, filed Jun. 15, 2011.
Notice of Allowance, dated Mar. 19, 2014, U.S. Appl. No. 13/277,149, filed Oct. 19, 2011.
Notice of Allowance dated Dec. 10, 2013 in Japanese Patent Application 2007-536911, filed Oct. 12, 2005.
Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%Assurance%20Tools.pdf>.
Specia et al. "Improving the Confidence of Machine Translation Quality Estimates," MT Summit XII, Ottawa, Canada, 2009, 8 pages.
Soricut et al., "TrustRank: Inducing Trust in Automatic Translations via Ranking", published in Proceedings of the 48th Annual Meeting of the Association for Computational Linguistics (Jul. 2010), pp. 612-621.
U.S. Appl. No. 11/454,212, filed Jun. 15, 2006.
Editorial Free Lancer Association, Guidelines for Fees, https://web.archive.org/web/20090604130631/http://www.the-efa.org/res/code_2.php, Jun. 4, 2009, retrieved Aug. 9, 2014.
Lynn Wasnak, "Beyond the Basics How Much should I Charge", https://web.archive.org/web/20070121231531/http://www.writersmarket.com/assets/pdf/How_Much_Should_I_Charge.pdf, Jan. 21, 2007, retrieved Aug. 19, 2014.
Summons to Attend Oral Proceedings dated Sep. 18, 2014 in German Patent Application 10392450.7, filed Mar. 28, 2003.
Examination Report dated Jul. 22, 2013 in German Patent Application 112005002534.9, filed Oct. 12, 2005.
Notice of Allowance, dated Sep. 10, 2014, U.S. Appl. No. 11/635,248, filed Dec. 5, 2006.

(56) References Cited

OTHER PUBLICATIONS

Non-Final Office Action, dated Jul. 15, 2014, U.S. Appl. No. 11/635,248, filed Dec. 5, 2006.
Supplemental Notice of Allowability, dated Aug. 28, 2014, U.S. Appl. No. 11/501,189, filed Aug. 7, 2006.
Notice of Allowance, dated Jun. 26, 2014, U.S. Appl. No. 11/501,189, filed Aug. 7, 2006.
Final Office Action, dated Jul. 14, 2014, U.S. Appl. No. 11/640,157, filed Dec. 15, 2006.
Non-Final Office Action, dated Jan. 28, 2014, U.S. Appl. No. 11/640,157, filed Dec. 15, 2006.
Notice of Allowance, dated May 5, 2014, U.S. Appl. No. 11/784,161, filed Apr. 4, 2007.
Supplemental Notice of Allowance, dated Jul. 30, 2014, U.S. Appl. No. 11/784,161, filed Apr. 4, 2007.
Notice of Allowance, dated Oct. 9, 2014, U.S. Appl. No. 12/132,401, filed Jun. 3, 2008.
Non-Final Office Action, dated Jun. 12, 2014, U.S. Appl. No. 12/218,859, filed Jul. 17, 2008.
Non-Final Office Action, dated Jun. 9, 2014, U.S. Appl. No. 12/510,913, filed Jul. 28, 2009.
Notice of Allowance, dated Oct. 7, 2014, U.S. Appl. No. 12/510,913, filed Jul. 28, 2009.
Non-Final Office Action, dated Jun. 23, 2014, U.S. Appl. No. 12/720,536, filed Mar. 9, 2010.
Notice of Allowance, dated Aug. 18, 2014, U.S. Appl. No. 13/417,071, filed Mar. 9, 2012.
Non-Final Office Action, dated Aug. 21, 2014, U.S. Appl. No. 13/089,202, filed Apr. 18, 2011.
Notice of Allowance, dated Jun. 13, 2014, U.S. Appl. No. 13/539,037, filed Jun. 29, 2012.
Office Action dated Feb. 2, 2015 in German Patent Application 10392450.7, filed Mar. 28, 2003.
Abney, Steven P. , "Parsing by Chunks," 1994, Bell Communications Research, pp. 1-18.
Leusch et al.. , "A Novel String-to-String Distance Measure with Applications to Machine Translation Evaluation", 2003, https://www-i6.informatik.rwth-aachen.de, pp. 1-8.
Oflazer, Kemal., "Error-tolerant Finite-state Recognition with Application to Morphological Analysis and Spelling Correction", 1996, https://www.ucrel.lancs.ac.uk, pp. 1-18.
Snover et al., "A Study of Translation Edit Rate with Targeted Human Annotation", 2006, https://www.cs.umd.edu/~snover/pub/amta06/ter_amta.pdf, pp. 1-9.
Levenshtein, V.I., "Binary Codes Capable of Correcting Deletions, Insertions, and Reversals", 1966, Doklady Akademii Nauk SSSR, vol. 163, No. 4, pp. 707-710.
Supplemental Notice of Allowability, dated Jan. 26, 2015, U.S. Appl. No. 12/510,913, filed Jul. 28, 2009.
Supplemental Notice of Allowability, dated Feb. 2, 2015, U.S. Appl. No. 12/510,913, filed Jul. 28, 2009.
Non-Final Office Action, dated Mar. 25, 2015, U.S. Appl. No. 12/720,536, filed Mar. 9, 2010.
Final Office Action, dated Jan. 21, 2015, U.S. Appl. No. 13/089,202, filed Apr. 18, 2011.
Non-Final Office Action, dated Mar. 19, 2015, U.S. Appl. No. 13/685,372, filed Nov. 26, 2012.
Non-Final Office Action, dated Jan. 8, 2015, U.S. Appl. No. 13/481,561, filed May 25, 2012.
Advisory Action, dated Apr. 14, 2015, U.S. Appl. No. 13/089,202, filed Apr. 18, 2011.
Final Office Action, dated May 22, 2015, U.S. Appl. No. 12/218,859, filed Jul. 17, 2008.
Non-Final Office Action, dated Apr. 16, 2015, U.S. Appl. No. 11/454,212, filed Jun. 15, 2006.
Notice of Allowance, dated Apr. 9, 2015, U.S. Appl. No. 11/640,157, filed Dec. 15, 2006.
Kumar, Shankar, "Minimum Bayes-Risk Techniques in Automatic Speech Recognition and Statistical Machine Translation: A dissertation submitted to the Johns Hopkins University in conformity with the requirements for the degree of Doctor of Philosophy," Baltimore, MD Oct. 2004.
Non-Final Office Action, dated Mar. 21, 2017, U.S. Appl. No. 13/089,202, filed Apr. 18, 2011.
Gao et al., Proceedings of the Joint Fifth Workshop on Statistical Machine Translation and Metrics (MATR), 2010, pp. 121-126.
Callison-Burch et al., "Findings of the 2011 Workshop on Statistical Machine Translation," In Proceedings of the Sixth Workshop on Statistical Machine Translation, Edinburgh, Scotland, July. Association for Computational Linguistics, 2011, pp. 22-64.
Bohar et al., "A Grain of Salt for the WMT Manual Evaluation," In Proceedings of the Sixth Workshop on Statistical Machine Translation, Edinburgh, Scotland, Association for Computational Linguistics, Jul. 2011, pp. 1-11.
Przybocki et al., "Gale Machine Translation Metrology: Definition, Implementation, and Calculation," Chapter 5.4 in Handbook of Natural Language Processing and Machine Translation, Olive et al., eds., Springer, 2011, pp. 783-811.
Snover et al., "Fluency, Adequacy, or HTER? Exploring Different Human Judgements with a Tunable MT Metric", In Proceedings of the Fourth Workshop on Statistical Machine Translation at the 12th Meeting of the EACL, pp. 259-268, 2009.
Cormode et al., "The String Edit Distance Matching Problem with Moves," in ACM Transactions on Algorithms (TALG), 3(1):1-19, 2007.
Kanthak et al., "Novel Reordering Approaches in Phrase-Based Statistical Machine Translation," In Proceedings of the ACL Workshop on Building and Using Parallel Texts, Jun. 2005, pp. 167-174.
Allauzen et al., "OpenFst: A General and Efficient Weighted Finitestate Transducer Library," In Proceedings of the 12th International Conference on Implementation and Application of Automata (CIAA), 2007, pp. 11-23.
Denkowski et al., "Meteor 1.3: Automatic Metric for Reliable Optimization and Evaluation of Machine Translation Systems," In Proceedings of the EMNLP 2011 Workshop on Statistical Machine Translation, Jul. 2011, pp. 85-91.
Lavie et al., "The Meteor Metric for Automatic Evaluation of Machine Translation," Machine Translation, Sep. 2009, 23: 105-115.
Crammer et al., "On the Algorithmic Implementation of Multi-Class SVMs," In Journal of Machine Learning Research 2, Dec. 2001, pp. 265-292.
Dreyer, Markus et al., "HyTER: Meaning-Equivalent Semantics for Translation Evaluation," In Proceedings of the 2012 Conference of the North American Chapter of the Association of Computational Linguistics: Human Language Technologies. Jun. 3, 2012. 10 pages.
Przybocki, M.; Peterson, K.; Bronsart, S.; Official results of the NIST 2008 "Metrics for MAchine TRanslation" Challenge (MetricsMATR08), 7 pages. http://nist.gov/speech/tests/metricsmatr/2008/results/; https://www.nist.gov/multimodal-information-group/metrics-machine-translation-evaluation#history; https://www.nist.gov/itl/iad/mig/metrics-machine-translation-2010-evaluation.
Advisory Action, dated Jul. 8, 2016, U.S. Appl. No. 13/089,202, filed Apr. 18, 2011.
Final Office Action, dated Sep. 28, 2016, U.S. Appl. No. 13/481,561, filed May 25, 2012.
Final Office Action, dated Oct. 4, 2016, U.S. Appl. No. 12/720,536, filed Mar. 9, 2010.
Non-Final Office Action, dated Jan. 27, 2017, U.S. Appl. No. 11/454,212, filed Jun. 15, 2006.
Hildebrand et al., "Adaptation of the Translation Model for Statistical Machine Translation based on Information Retrieval," EAMT 2005 Conference Proceedings (May 2005), pp. 133-142 (10 pages).
Och et al., "The Alignment Template Approach to Statitstical Machine Translation," Journal Computational Linguistics, vol. 30, Issue 4, Dec. 2004, pp. 417-449 (39 pages).
Sethy et al, "Buidling Topic Specific Language Models from Webdata Using Competitive Models," Interspeech 2005—Eurospeech, 9th European Conference on Speech Communication and Technology, Lisbon, Portugal, Sep. 4-8, 2005. 4 pages.

(56) References Cited

OTHER PUBLICATIONS

Potet et al., "Preliminary Experiments on Using Users; Post-Editions to Enhance a SMT System," Proceedings of the15th Conference of the European Association for Machine Translation, May 2011, pp. 161-168.

Ortiz-Martinez et al., "An Interactive Machine Translation System with Online Learning," Proceedings of the ACL-HLT 2011 System Demonstrations, Jun. 21, 2011, pp. 68-73.

Lopez-Salcedo et al., "Online Learning of Log-Linear Weights in Interactive Machine Translation," Communications in Computer and Information Science, vol. 328, 2012. 10 pages.

Blanchon et al., "A Web Service Enabling Gradable Post-edition of Pre-translations Produced by Existing Translation Tools: Practical Use to Provide High Quality Translation of an Online Encyclopedia," Jan. 2009. 8 pages.

Levenberg et al., "Stream-based Translation Models for Statistical Machine Translation," Human Language Technologies: The 2010 Annual Conference of the North American Chapter of the ACL, Jun. 2010, pp. 394-402.

Lagarda et al., "Statistical Post-Editing of a Rule-Based Machine Translation System," Proceedings of NAACL HLT 2009, Jun. 2009, pp. 217-220.

Ehara, "Rule Based Machine Translation Combined with Statistical Post Editor for Japanese to English Patent Translation," MT Summit XI, 2007, pp. 13-18.

Bechara et al., "Statistical Post-Editing for a Statistical MT System," Proceedings of the 13th Machine Translation Summit, 2011, pp. 308-315.

Dobrinkat, "Domain Adaptation in Statistical Machine Translation Systems via User Feedback," Abstract of Master's Thesis, Helsinki University of Technology, Nov. 25, 2008, 103 pages.

Business Wire, "Language Weaver Introduces User-Managed Customization Tool," Oct. 25, 2005, 3 pages. http://www.businesswire.com/news/home/20051025005443/en/Language-Weaver-Introduces-User-Managed-Customization-Tool-Newest.

Winiwarter, "Learning Transfer Rules for Machine Translation from Parallel Corpora," Journal of Digital Information Management, vol. 6, No. 4, Aug. 1, 2008, pp. 285-293 (9 pages).

Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.

Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.

Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.

Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.

Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.

Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.

Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.

Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.

Hardmeier et al. "Tree Kernels for Machine Translation Quality Estimation" [W12-3112] Proceedings of the Seventh Workshop on Statistical Machine Translation, Jun. 7, 2012, pp. 109-113. Retrieved from: http://aclanthology.info/volumes/proceedings-of-the-seventh-workshop-onstatistical-machine-translation.

Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.

Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.

Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.

Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.

Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.

Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.

Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.

Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.

"Best Practices—Knowledge Base," Lilt website [online], Mar. 6, 2017 [retrieved on Oct. 19, 2017], Retrieved from the Internet:<https://lilt.com/kb/translators/best-practices>, 2 pages.

"Data Security—Knowledge Base," Lilt website [online], Oct. 14, 2016 [retrieved on Oct. 19, 2017], Retrieved from the Internet:<https://lilt.com/kb/security>, 1 pages.

"Data Security and Confidentiality," Lilt website [online], 2017 [retrieved on Oct. 19, 2017], Retrieved from the Internet: <https://lilt.com/security>, 7 pages.

"Memories—Knowledge Base," Lilt website [online], Jun. 7, 2017 [retrieved on Oct. 19, 2017], Retrieved from the Internet:<https://lilt.com/kb/project-managers/memory>, 4 pages.

(56) References Cited

OTHER PUBLICATIONS

"Memories (API)—Knowledge Base," Lilt website [online], Jun. 2, 2017 [retrieved on Oct. 19, 2017], Retrieved from the Internet:<https://lilt.com/kb/api/memories>, 1 page.
"Quoting—Knowledge Base," Lilt website [online], Jun. 7, 2017 [retrieved on Oct. 19, 2017], Retrieved from the Internet: <https://lilt.com/kb/project-managers/quoting>, 4 pages.
"The Editor—Knowledge Base," Lilt website [online], Aug. 15, 2017 [retrieved on Oct. 19, 2017], Retrieved from the Internet:<https://lilt.com/kb/translators/editor>, 5 pages.
"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.
"What is Lilt_ —Knowledge Base," Lilt website [online],Dec. 15, 2016 [retrieved on Oct. 19, 2017], Retrieved from the Internet:<https://lilt.com/kb/what-is-lilt>, 1 page.
"Getting Started—Knowledge Base," Lilt website [online], Apr. 11, 2017 [retrieved on Oct. 20, 2017], Retrieved from the Internet:<https://lilt.com/kb/translators/getting-started>, 2 pages.
"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.
"Lilt API_API Reference," Lilt website [online], retrieved on Oct. 20, 2017, Retrieved from the Internet:<https://lilt.com/docs/api>, 53 pages.
"Automatic Translation Quality—Knowledge Base", Lilt website [online], Dec. 1, 2016, retrieved on Oct. 20, 2017, Retrieved from the Internet<https://lilt.com/kb/evaluation/evaluate-mt>, 4 pages.
"Projects—Knowledge Base," Lilt website [online], Jun. 7, 2017, retrieved on Oct. 20, 2017, Retrieved from the Internet: <https://lilt.com/kb/project-managers/projects>, 3 pages.
"Getting Started with lilt," Lilt website [online], May 30, 2017, retrieved on Oct. 20, 2017, Retrieved from the Internet: <https://lilt.com/kb/api/lilt-js>, 6 pages.
"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.
"Office Action," German Application No. 112005002534.9, dated Feb. 7, 2018, 6 pages (9 pages including translation).
Non-Final Office Action, dated Mar. 8, 2016, U.S. Appl. No. 13/481,561, filed May 25, 2012.
Final Office Action, dated Apr. 19, 2016, U.S. Appl. No. 13/089,202, filed Apr. 18, 2011.
Final Office Action, dated Jul. 8, 2015, U.S. Appl. No. 12/720,536, filed Mar. 9, 2010.
Advisory Action, dated Jul. 20, 2015, U.S. Appl. No. 12/218,859, filed Jul. 17, 2008.
Final Office Action, dated Jul. 24, 2015, U.S. Appl. No. 13/481,561, filed May 25, 2012.
Notice of Allowance, dated Aug. 4, 2015, U.S. Appl. No. 13/685,372, filed Nov. 26, 2012.
Supplemental Notice of Allowability, dated Aug. 17, 2015, U.S. Appl. No. 13/685,372, filed Nov. 26, 2012.
Advisory Action, dated Sep. 17, 2015, U.S. Appl. No. 12/720,536, filed Mar. 9, 2010.
Notice of Allowance, dated Sep. 21, 2015, U.S. Appl. No. 14/051,175, filed Oct. 10, 2013.
Final Office Action, dated Oct. 15, 2015, U.S. Appl. No. 11/454,212, filed Jun. 15, 2006.
Non-Final Office Action, dated Nov. 10, 2015, U.S. Appl. No. 13/089,202, filed Apr. 18, 2011.
Non-Final Office Action, dated Feb. 26, 2016, U.S. Appl. No. 12/720,536, filed Mar. 9, 2010.

\* cited by examiner

LANGUAGE CAPABILITY ASSESSMENT AND TRAINING APPARATUS AND TECHNIQUES

BACKGROUND

Text-to-text applications may be used for various purposes, including speech recognition, machine translation from one language to another, as well as automated summarization. A typical text to text application learns information from a training corpus, and uses the learned information to carry out the text to text operation.

One text to text application is machine translation, which is often used to automatically translate from one language to another. Machines including computers have also been used for educational purposes, such as in classrooms and the like.

SUMMARY

The present application describes a new text to text application which allows assessing a user's ability to translate from a first language into a second language. According to an aspect, the application is used for matching an entered answer against a correct answer, and producing an output based on training data within the text to text application, where there are many different correct answers, each of which is completely correct.

An aspect includes that there may be many correct answers, since, for example, there may be many ways of translating phrases from the source language to the target language. In an embodiment, any answer that is entered by the user is compared against an entire matrix of correct answers.

Another aspect describes providing feedback to the user indicating their mistakes, and providing at least one helping them identify those mistakes.

An embodiment describes the text to text application as being language translation, and in the embodiment, the application helps the user to learn a new language by assessing their abilities. An embodiment provides feedback which can be used as part of the learning tool. The feedback may provide more detailed information about which parts of their abilities are lacking and/or better answers.

BRIEF DESCRIPTION OF THE DRAWINGS

These and other aspects will now be described with reference to the accompanying drawings, wherein.

DETAILED DESCRIPTION

The general structure and techniques, and more specific embodiments which can be used to effect different ways of carrying out the more general goals are described herein.

Figure 1:
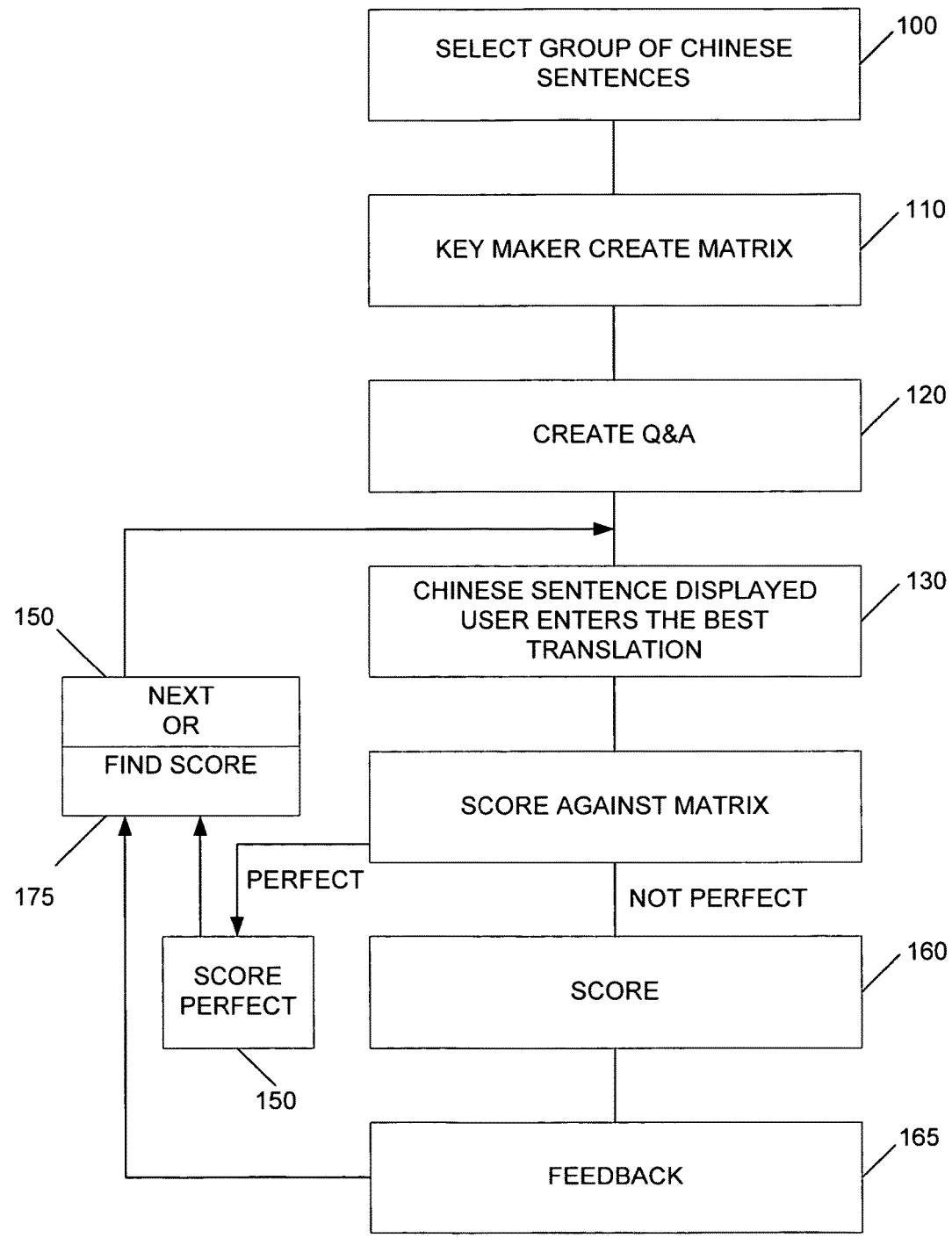
FIG. 1 shows a flowchart of the operation of the system.

The overall operation of the embodiment is illustrated with reference to FIG. 1. FIG. 1 illustrates how this system would operate for testing a person's translation ability. It should be understood, however, that this system is also capable of being used for determining speech ability, or determining summarization ability, or more generally, for analyzing any text-to-text application where there are a number of different possible correct answers. The system operates by comparing an input from a user to the plurality of possible correct answers.

For the embodiment, the system is assessing a person's Chinese to English translation ability. For example, a government agency may want to hire people who can translate Chinese documents into fluent English. At the same time, the system may provide tools to help individual translators improve their Chinese to English skills. The two basic tasks of assessment and tutoring may be provided to different users, or to the same user. It should of course be understood that any language pair can be used in place of the Chinese and English, and that Chinese and English are provided as being an exemplary language pair.

In operation, first a number of test questions must be selected for assessment. At 100, a group of Chinese sentences is selected. This may be done manually and placed into a database, or may be done automatically by simply choosing sentences from a database.

At 110, a key maker is used to build a network of correct English translations. The key maker may be a person that manually builds the translation. Alternatively, the key maker may use a machine that automatically translates, with final checking for example done by a person. A special user interface is used so that the key maker can facilitate the processing. The final network has millions of correct translation, for example. There are likely millions of possible correct answers for any translations.

110 shows this generically as creating a matrix, but it should be understood that different ways of representing the multiple different answers that are contemplated in this embodiment.

At 120, the operation of the program begins, by creating questions and answers "Q&A" and creating a user interface that is accessible by a human.

The operations described herein may be carried out on computers, which may be any kind of computer, either general purpose, or some specific purpose computer such as a workstation. The computer may be a Pentium class computer, running Windows XP or Linux, or may be an Apple Macintosh computer. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

Figure 2:
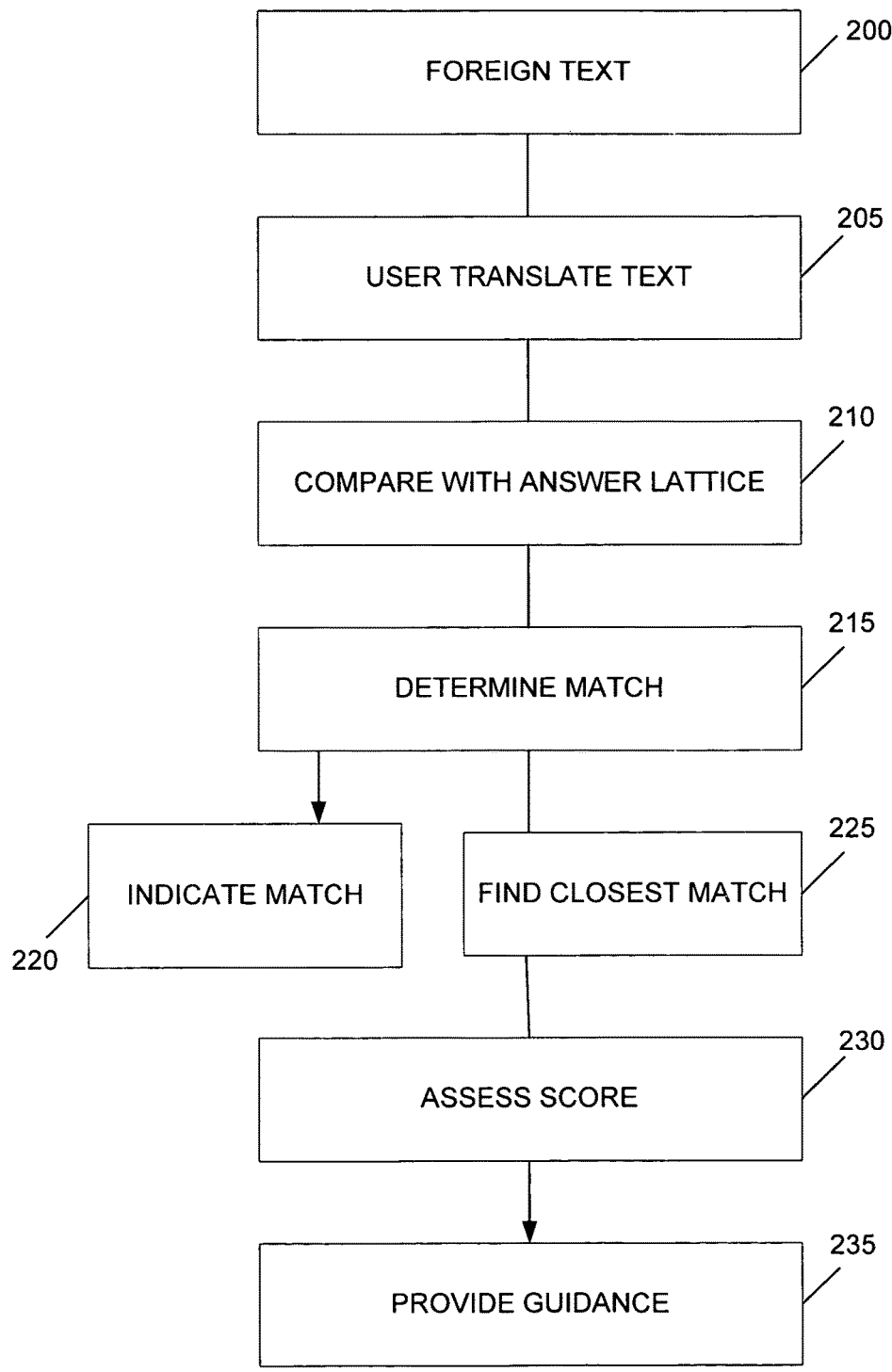
FIG. 2 shows a flowchart of operation of the overall operation of the system.

FIG. 2 shows an overall flow diagram of this system when used for detecting correct answers in a language translation context. The system is intended to be used to help learn a new language, and to assess end-user ability in that language.

In operation, 200 represents the foreign language text being displayed to a user or student. The user translates the text at 205. The translation is compared with a matrix of prestored correct answers at 210. There may be millions of correct ways of translating any foreign language phrase or sentence into another language. In the embodiment, these many different ways of translating are represented in a compact form, where certain common paths are not restored. The translation is compared, and at 215 a match is determined. If an exact match is determined, 220 indicates that by indicating that an exact match has been determined. If no exact match is determined, then the closest match is determined at 225, and a score is assessed at 230. The score may represent the extent to which the correct answer deviated from the given answer. At 235, the program may produce a feedback guidance screen that indicates information about what errors the user made in the translation, and how to fix them. The feedback is based on the specific kind of error that was made by the user.

In an embodiment, the correct answer is stored in a compact graphical representation where paths through the graph may represent many different possible correct answers. The compact representation may be a recursive transition network ("RTN"), in which a graph is represented with certain parts of the graph represented by variables that represent commonly occurring portions within the graph. Another alternative may include representing the correct answer using IDL or weighted IDL.

The comparison between the user's entered answer and the lattice of answers determines one of a number of different kinds of errors which can exist. Exemplary errors may include word insertion (an extra word being inserted), word deletion (a missing word), word substitution (the wrong word being used), word permutation (wrong order to words), word stemming (wrong or different endings to the words), and paraphrasing (similar meaning but not exactly the same meaning). In order to obtain an accurate assessment of the degree of error, each of these may be appropriately analyzed. In one aspect, each generic error is counted as a single error, even if it causes many different word and/or placement variations. For example, an embodiment counts a word permutation as a single error even though two different words are out of order. In addition, the different errors, such as word insertion and word deletion may be counted as different values; for example, insertion may be less seriously weighted than deletion.

Figure 3:
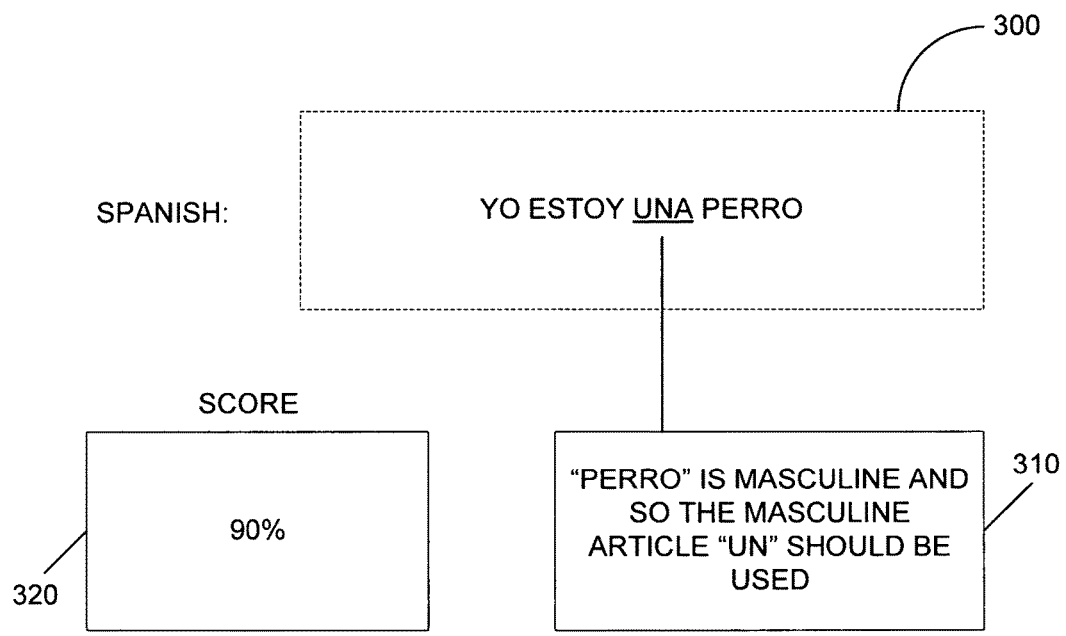
FIG. 3 illustrates a user screen.

235 represents providing feedback based on the specific kind of error. The feedback may be displayed or otherwise provided to the user. In one embodiment, the feedback may be displayed as a display which shows the errors and some possible ways to deal with the errors. For example, this may show a display such as shown in FIG. 3. FIG. 3 shows the sample sentence "I am a dog" in English, being translated by the student in the text box 300. The sample output with the incorrect words (here "una") being underlined, and a brief description 310 of the kind of error which has been noted. A score is also provided as 320, which represents the number of errors noted in the translation, and the kinds of errors.

In one aspect, an answer key of all the answers is provided. This can be provided in the form for example of a graph. Nodes in the graph which represent synonyms that may be present at various places in the graph may be replaced by shorthand representations of those synonyms, such as a variable. For example, if the sentence is about a battle, then battle, fight and fighting may be synonyms which may be present in the graph. Each place where those words are duplicated will be replaced by a single transition, for example a transition labeled as "A". A special graphical user interface may be used for making this graph. The graphical user interface is basically a drawing program that generates the different nodes in the graph, but also allows those nodes to be translated into the answer lattice when complete. Another aspect is that the GUI may generate random sentences as paths through the graph, to enable testing the graph. Another aspect is that the GUI may enable minimization of the graph, that is to remove duplicate parts of the graph, by replacing those duplicate parts by the variables that represent commonly used transitions.

In operation, the model answer is compared against the different aspects in the graph, to determine "costs". Different kinds of errors may lead to different kinds of costs, depending on how important those errors are. The costs can be set by trial and error, or can be simply assigned. There may be a lower cost for insertion or deletion of pronouns, and compared that to a higher cost for use of the noun, e.g., the use of the word Apple versus Orange.

The overall algorithm may simply use a brute force approach which exhaustively searches through the graph. However, this may not be practical in terms of processing power, since it may require analyzing each of the perhaps millions of correct answers for a text-to-text system.

Figure 4:
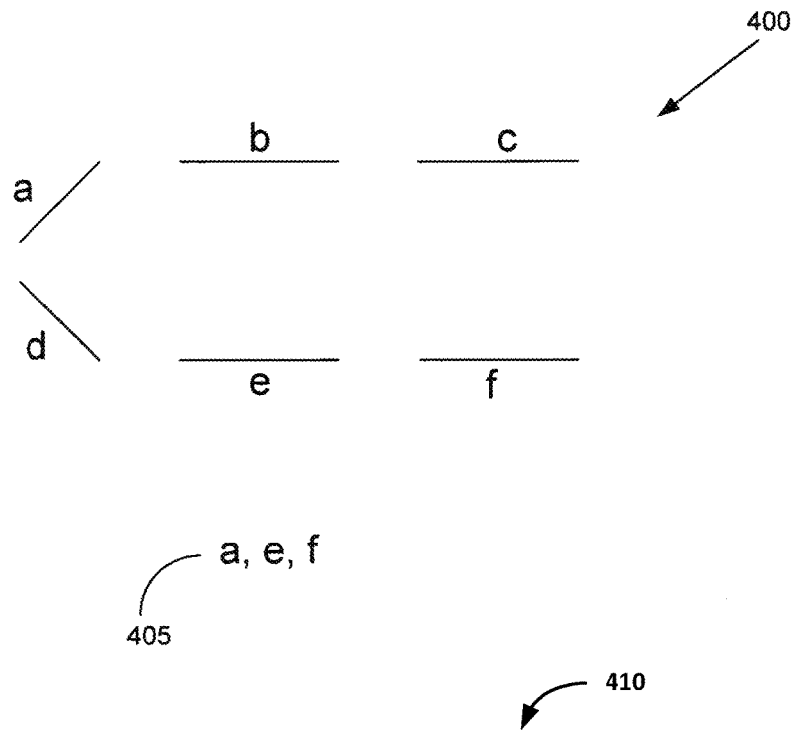
FIG. 4 illustrates a speed up technique.

A speed up technique is described with reference to FIG. 4 the algorithm speed of technique which uses a search over a complete estimator. For example, at each step, a few hypotheses may be maintained. Each hypothesis includes a current cost, and the characteristic. All of the different paths are always maintained, but the path with the most promising hypothesis is followed. A few of the different search states may also be maintained. Only one of the search states will have the lowest cost, and a heuristic between the remaining length and the end of the finite state search length may also be used. By assessing the promise of each state, and being conservative with the estimate, it is ensured that the estimate will always be in the correct position.

The speed up technique will be illustrated in the following. FIG. 4 shows the State graph 400, and the input to the State graph. The input is shown as 405. A priority queue 410 is maintained which represents the different states as the system passes through the queue.

For the first pass through the queue, two entries are created shown as 411 and 412. The first entry is shown as the input, here a, the path here also a, and the cost, here 0. The second input 412 includes the input, here a, the path, here d, and the cost which here is 1. The path 411 has the minimum cost, so successor states to that path are created as 413, 414. However, the path 412 remains. The successor states shown as 413, 414, here ae/ab with a cost of 1, and a/ab, with a cost of 1. Eventually, the state aef/def is reached with cost 1, which is the best match for aef.

Each of these pieces represent a representation of a position in the lattice. This produces a stack of states that can be searched backwards.

The above has described this being used for translation, however it should be understood that the same techniques can also be applied to summarization, speech recognition, or testing of pronunciation. Any kind of language problem that has multiple answers can be handled in this way.

The feedback can simply be feedback which is tailored to specific errors, or alternatively can be feedback which is quoted back from a grammar book, or from the translation database. Queries into the database looking for specific languages that are targeted to the example can be used.

In another aspect, a specific error that is made of can be represented by a special type of indicia, and specific and special guidance for that, and error can be provided. According to another aspect, the feedback can represent all of the legal ways to say for specific thing.

Although only a few embodiments have been disclosed in detail above, other embodiments are possible and the inventor (s) intend these to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, other applications of this system may be possible.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method for analyzing user language capability, the method comprising:
   generating an answer key for a text to text based question regarding translation of a source text string from a source language to a target language, the source text string including a plurality of words, the answer key comprising a plurality of answers, the plurality of answers all consisting of completely correct answers to the text to text based question, each of the completely correct answers including a phrase having a plurality of words in the target language;
   storing the answer key for the text to text based question in a packed format in an answer database on a computer, the packed format of each correct answer including a plurality of paths, the packed format of the answer key including certain common paths that are not stored repeatedly;
   presenting the text to text based question regarding the source text to a user using the computer;
   accepting, at the computer, an answer to the text to text based question as input from the user, the answer including a text translation of the source text, the text translation representing the user's answer to the text to text based question regarding the source text for which the answer key has been determined; and
   executing a program resident on a storage medium to cause the computer to:
      search selected paths of the answer key without analyzing all of the plurality of different paths representing correct answers stored in the answer key,
      determine an error cost for each selected path in the answer key, the error cost based on errors between the text translation and the correct answer represented by the analyzed path,
      present an answer to the user representing a path having a lowest error cost in the answer key,
      determine from the error cost if the presented answer is an exact match, and
      if the presented answer is not an exact match, display feedback to the user based on errors between the text translation and the presented answer, the feedback including an error score based on the error cost of the presented answer.

2. A method as in claim 1, wherein the error score for the displayed answer is based on a cost assigned to each kind of error.

3. A method as in claim 2, wherein said scoring the answers comprises counting an error only once even when multiple parts are affected by said error.

4. A method as in claim 1, wherein the displayed feedback is based on a specific kind of error to help the user in understanding more about said error.

5. A method as in claim 1, wherein packed format of the answer key comprises a matrix of prestored correct answers, which includes millions of different correct answers.

6. A method as in claim 5, wherein said generating the answer key comprises forming a user interface which facilitates entry of the many different answers.

7. A method as in claim 6, wherein said user interface includes an associated tool that tests certain ones of said many different answers.

8. A method as in claim 1, wherein said packed format is a recursive transition network.

9. A method as in claim 1, wherein analyzing said paths of the answer key further comprises representing correct answers by maintaining a list including most promising single hypotheses through the packed database, and following the most promising hypothesis.

10. A method as in claim 3, wherein said errors include word insertion errors, word deletion errors, word substitution errors, word permutation errors, word stemming errors, and paraphrasing errors.

11. A method for analyzing user language capability, the method comprising:
   displaying a first text having a plurality of words in a first language to a user;
   determining an answer key for translation of the first text from the first language to a second language, the answer key comprising a plurality of completely correct answers to a text to text based question about the first text, each of the completely correct answers having a phrase including a plurality of words in the second language;
   storing the answer key for the translation of the first text, each of the completely correct answers in the answer key stored in a matrix of prestored answers;
   presenting to the user the text to text based question about translation of the first text between the first language and the second language;
   accepting input of a text translation of the first text in the second language from the user as a response to the text to text based question about translation, the text translation generated by the user; and
   executing a program resident on a storage medium to cause a machine to:
      search selected paths of the answer key, the search performed without analyzing all of the plurality of different paths representing correct answers stored in the answer key using a speed up technique over a complete estimator,
      determine an error cost for each path analyzed in the answer key,
      present a best answer to the user representing a path having a lowest error cost in the answer key,
      determine from the error cost if the presented answer is an exact match, and
      if the presented answer is not an exact match, presenting feedback to the user based on errors between the text translation and the displayed answer, the feedback including an error score based on the error cost of the displayed answer.

12. A method as in claim 11, further comprising providing feedback to the user indicating specific information about the kind of errors made in said translation.

13. A method as in claim 12, wherein a calculation of the error score includes scoring each of a plurality of errors as being a single kind of error even when said error affects more than one word.

14. A method as in claim 13, wherein said calculation of the error score comprises continued considering a single error for each of word insertion, word deletion, word substitution, word permutation, word stemming, and paraphrasing.

15. A method as in claim 11, wherein said search comprises following a most promising path through the matrix of correct answers.

16. An apparatus for analyzing user language capability, the apparatus comprising:
an interface part operating to:
accept a text translation as input from a user representing the user's answer to a text to text based question about translation of a phrase having a plurality of words, the translation between a first language and a second language, and
accept a plurality of different predetermined correct answers to the text to text based question, each of the plurality of correct answers including a plurality of parts, and each of the correct answers predetermined to be completely correct;
a database, in which said plurality of different predetermined correct answers are stored in a packed format, where at least two or more of the plurality of said answers rely on common information for one or more parts of said correct answers; and
a machine, which operates to:
analyze a plurality of paths representing correct answers of the stored correct answers without analyzing paths of all of the stored correct answers to determine error costs of the analyzed paths,
identify an analyzed path having a lowest error cost,
display a correct answer corresponding to the identified path to the user, wherein:
if the error cost for the displayed correct answer is zero, the display indicates to the user that the text translation input is a correct answer, and
if the error cost for the displayed correct answer is not zero, the display includes an error score based on the error cost.

17. An apparatus as in claim 16, wherein said machine calculates error scores for each of the plurality of analyzed paths representing correct answers according to a kind of said errors.

18. An apparatus as in claim 16, wherein said machine counts an error between the displayed answer and said text translation input only once even when multiple parts of the displayed answer are affected by said error.

19. An apparatus as in claim 18, wherein said machine determines, from said error, feedback to help the user in understanding more about said error.

20. An apparatus as in claim 16, wherein the answer key comprises a matrix which includes each of said plurality of different correct answers.

21. An apparatus as in claim 20, further comprising an answer matrix user interface that allows entry of details of said answer matrix, and which facilitates entry of the plurality of different correct answers.

22. An apparatus as in claim 21, wherein said answer matrix user interface includes an associated tool that tests certain ones of said plurality of different correct answers.

23. An apparatus as in claim 16, wherein said packed format is a recursive transition network.

24. An apparatus as in claim 16, wherein said machine operates by analyzing each of said plurality of paths representing correct answers of the stored correct answers by maintaining a list including a most promising single hypotheses through the packed format of the correct answers in the database, and following the most promising hypothesis.

25. An apparatus as in claim 18, wherein said errors include word insertion errors, word deletion errors, word substitution errors, word permutation errors, word stemming errors, and paraphrasing errors.

26. An apparatus for analyzing user bi-lingual language capability, the apparatus comprising:
a machine that includes a memory for storing answer keys in a matrix, each of the answer keys including a plurality of prestored answers to a translation question, each of the prestored answers in the matrix consisting of completely correct answers to a text-to-text based question, each of the completely correct answers including a phrase having a plurality of words,
said machine operating to produce signals indicative of a user interface that operates to display a first text in a first language to a user, and accepts a text translation as input of the text in a second language from the user as a translation,
said machine determining either an exact match or a closest match between the translation and any prestored answer to the question in the matrix, where
a plurality of the paths representing correct answers of the stored correct answers is analyzed without analyzing paths of all of the stored correct answers to determine error costs of the analyzed paths;
an analyzed path is identified as having a lowest error cost for all of the stored correct answers;
a correct answer corresponding to the identified path is displayed to the user;
if the error cost for the displayed correct answer is zero, the text translation input is indicated as being a correct answer; and
if the error cost for the displayed correct answer is not zero, an error score is displayed to the user as feedback to indicate an error and represent the error cost.

27. An apparatus as in claim 26, wherein said machine further provides feedback to the user indicating information about specific kinds of errors made in said translation.

28. An apparatus as in claim 26, wherein said machine calculates an error cost for each of a plurality of paths and one or more kinds of errors, each of the one or more kinds of errors considered as being a single error even when said error affects more than one word.

29. A method as in claim 1, wherein the user is a learning system for a text-to-text machine translation system.

30. A method as in claim 29, wherein the learning system and computer communicate the presented text-to-text based question and answer to the text-to-text based question over a network.

* * * * *